US012081067B2

(12) United States Patent
Beyerl et al.

(10) Patent No.: US 12,081,067 B2
(45) Date of Patent: Sep. 3, 2024

(54) ELECTRIC MOTOR

(71) Applicant: MILWAUKEE ELECTRIC TOOL CORPORATION, Brookfield, WI (US)

(72) Inventors: Andrew T. Beyerl, Pewaukee, WI (US); Keith Boulanger, Kenosha, WI (US); Ryan B. Jipp, Brookfield, WI (US); Timothy R. Obermann, Waukesha, WI (US); Matthew R. Bailey, Racine, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 541 days.

(21) Appl. No.: 17/052,456

(22) PCT Filed: Jun. 2, 2020

(86) PCT No.: PCT/US2020/035633
§ 371 (c)(1),
(2) Date: Nov. 2, 2020

(87) PCT Pub. No.: WO2020/247326
PCT Pub. Date: Dec. 10, 2020

(65) Prior Publication Data
US 2023/0155430 A1    May 18, 2023

Related U.S. Application Data

(60) Provisional application No. 62/870,125, filed on Jul. 3, 2019, provisional application No. 62/857,337, filed on Jun. 5, 2019.

(51) Int. Cl.
H02K 1/14 (2006.01)
H02K 3/34 (2006.01)
H02K 3/52 (2006.01)

(52) U.S. Cl.
CPC ............. H02K 1/148 (2013.01); H02K 3/345 (2013.01); H02K 3/522 (2013.01)

(58) Field of Classification Search
CPC ........ H02K 1/148; H02K 3/345; H02K 3/522; H02K 3/34; H02K 3/487; H02K 1/146;
(Continued)

(56) References Cited

U.S. PATENT DOCUMENTS 10,312,778 B2    6/2019   Katsuragi et al.
2003/0214196 A1* 11/2003  Cai ......................... H02K 3/12
                                                            310/208

(Continued)

FOREIGN PATENT DOCUMENTS

DE    102012212637 A1    1/2014
JP          S6110933 A    1/1986
(Continued)

OTHER PUBLICATIONS

Inuzuka Junya, Electric Tool, Dec. 20, 2018, WO 2018230384 (English Machine Translation) (Year: 2018).*

(Continued)

Primary Examiner — Alexander A Singh
(74) Attorney, Agent, or Firm — Michael Best & Friedrich LLP

(57) ABSTRACT

A stator includes insulation including a back insulation portion covering a back stator portion, a first tooth portion covering a first tooth, a second tooth portion covering a second tooth. A first flange portion has a first face that is in facing relationship with the back insulation portion. A second flange portion has a second face that is in facing relationship with the back insulation portion. The first face and the second face together substantially defining a boundary plane, such that a cross-sectional slot area is defined between the back insulation portion, the first tooth portion, (Continued)

the second tooth portion, and the boundary plane. A plurality of conductive wires are arranged in the cross-sectional slot area, the wires defining a cross-sectional winding area within the cross-sectional slot area. A ratio of the cross-sectional winding area to the cross-sectional slot area is greater than or equal to 0.45.

16 Claims, 27 Drawing Sheets

(58) Field of Classification Search
CPC ............ H02K 3/325; H02K 1/16; H02K 3/28; H02K 2213/03
USPC ........................................ 310/254.1, 214, 215
See application file for complete search history.

(56) References Cited

U.S. PATENT DOCUMENTS

| | | | |
|---|---|---|---|
| 2004/0113511 A1 | 6/2004 | Schmidt et al. | |
| 2009/0039727 A1* | 2/2009 | Kato | H02K 1/148 |
| | | | 310/216.135 |
| 2010/0109471 A1* | 5/2010 | Tellier | H02K 1/148 |
| | | | 310/216.074 |
| 2012/0126653 A1* | 5/2012 | Yang | H02K 1/146 |
| | | | 310/156.32 |
| 2014/0131059 A1 | 5/2014 | Verbrugge et al. | |
| 2016/0036277 A1 | 2/2016 | Lynch et al. | |
| 2017/0106522 A1* | 4/2017 | Coates | H02K 9/227 |
| 2017/0110945 A1 | 4/2017 | Crosby et al. | |
| 2017/0133901 A1 | 5/2017 | Burch et al. | |
| 2018/0269757 A1 | 9/2018 | Fiederling et al. | |
| 2019/0131828 A1 | 5/2019 | Oketani | |

FOREIGN PATENT DOCUMENTS

| | | |
|---|---|---|
| JP | H09219959 A | 8/1997 |
| JP | 2013081327 A | 5/2013 |
| JP | 2015023771 A | 2/2015 |
| KR | 1020090053199 A | 5/2009 |
| WO | 9718616 A1 | 5/1997 |
| WO | WO-2018230384 A1 * 12/2018 | ........... B25D 11/125 |

OTHER PUBLICATIONS

International Search Report and Written Opinion for Application No. PCT/US2020/035633 dated Oct. 26, 2020 (13 pages).
Extended European Search Report for Application No. 20817890.5 dated Jun. 23, 2023 (19 pages).

* cited by examiner

ELECTRIC MOTOR

CROSS-REFERENCE TO RELATED APPLICATIONS

This application is a national phase filing under 35 U.S.C. 371 of International Application No. PCT/US2020/035633 filed on Jun. 2, 2020, which claims priority to U.S. Provisional Patent Application No. 62/870,125 filed on Jul. 3, 2019, and U.S. Provisional Patent Application No. 62/857,337 filed on Jun. 5, 2019, the entire contents of which are incorporated herein by reference.

FIELD OF THE INVENTION

The present invention relates to electric motors, and more particularly to stators for electric motors.

BACKGROUND OF THE INVENTION

A stator includes a plurality of teeth that each respectively retain a stator coil. A variety of methods can be used to wind the stator coils around the teeth.

SUMMARY OF THE INVENTION

The invention provides, in one aspect, stator comprising a back stator portion, a first tooth extending radially inward from the back portion, a second tooth extending radially inward from the back portion, a first flange extending away from the first tooth, a second flange extending away from the second tooth and toward the first flange, and insulation. The insulation includes a back insulation portion covering the back stator portion, a first tooth portion covering the first tooth, a second tooth portion covering the second tooth, and a first flange portion covering the first flange. The first flange portion has a first face that is in facing relationship with the back insulation portion. The insulation further includes a second flange portion covering the second flange. The second flange portion has a second face that is in facing relationship with the back insulation portion. The first face and the second face together substantially define a boundary plane, such that a cross-sectional slot area is defined between the back insulation portion, the first tooth portion, the second tooth portion, and the boundary plane. The stator further comprises a plurality of conductive wires arranged between the first and second teeth in the cross-sectional slot area, the plurality of conductive wires defining a cross-sectional winding area within the cross-sectional slot area. A ratio of the cross-sectional winding area to the cross-sectional slot area is greater than or equal to 0.45.

The invention provides, in another aspect, a power tool comprising an output member, a brushless, direct current electric motor having a rotor configured to provide torque to the output member and a stator. The stator comprises a back stator portion, a first tooth extending radially inward from the back portion, a second tooth extending radially inward from the back portion, a first flange extending away from the first tooth, a second flange extending away from the second tooth and toward the first flange, and insulation. The insulation includes a back insulation portion covering the back stator portion, a first tooth portion covering the first tooth, a second tooth portion covering the second tooth, and a first flange portion covering the first flange. The first flange portion has a first face that is in facing relationship with the back insulation portion. The insulation further includes a second flange portion covering the second flange. The second flange portion has a second face that is in facing relationship with the back insulation portion. The first face and the second face together substantially define a boundary plane, such that a cross-sectional slot area is defined between the back insulation portion, the first tooth portion, the second tooth portion, and the boundary plane. The stator further comprises a plurality of conductive wires arranged between the first and second teeth in the cross-sectional slot area, the plurality of conductive wires defining a cross-sectional winding area within the cross-sectional slot area. The power tool further comprises a battery configured to provide power to the motor and a motor drive circuit configured to control operation of the motor. A ratio of the cross-sectional winding area to the cross-sectional slot area is greater than or equal to 0.45.

The invention provides, in yet another aspect, a method of forming a stator. The method comprises forming a first stator segment with first and second teeth, applying a first layer of insulation around the first tooth, applying a second layer of insulation around the second tooth, winding a first stator coil around the first layer of insulation, winding a second stator coil around the second layer of insulation, electrically connecting the first and second stator coils, forming a second stator segment with third and fourth teeth, applying a third layer of insulation around the third tooth, applying a fourth layer of insulation around the fourth tooth, winding a third stator coil around the third layer of insulation, winding a fourth stator coil around the fourth layer of insulation, electrically connecting the third and fourth stator coils, forming a third stator segment with fifth and sixth teeth, applying a fifth layer of insulation around the fifth tooth, applying a sixth layer of insulation around the sixth tooth, winding a fifth stator coil around the fifth layer of insulation, winding a sixth stator coil around the sixth layer of insulation, electrically connecting the fifth and sixth stator coils, axially coupling the first stator segment to the second stator segment, and axially coupling the third stator segment to the first stator segment.

The invention provides, in yet another aspect, a method of forming a stator. The method comprises forming a first stator segment with first, second, and third teeth, applying a first layer of insulation around the first tooth, applying a second layer of insulation around the second tooth, applying a third layer of insulation around the third tooth, winding a first stator coil around the first layer of insulation, winding a second stator coil around the second layer of insulation, winding a third stator coil around the third layer of insulation, forming a second stator segment with fourth, fifth, and sixth teeth, applying a fourth layer of insulation around the fourth tooth, applying a fifth layer of insulation around the fifth tooth, applying a sixth layer of insulation around the sixth tooth, winding a fourth stator coil around the fourth layer of insulation, winding a fifth stator coil around the fifth layer of insulation, winding a sixth stator coil around the sixth layer of insulation, and axially coupling the first stator segment to the second stator segment.

The invention provides, in yet another aspect, a stator comprising a back portion and a tooth having a spoke portion extending radially inward from the back portion and a flange extending transverse to the spoke portion, such that a slot is defined between the flange and the back portion. The stator further comprises a stator coil wound around the spoke portion of the tooth and within the slot in progressive turns including a first turn, a plurality of intermediate turns, and a final turn. The final turn of the stator coil has a greater cross sectional length than a first turn of the stator coil.

The invention provides, in yet another aspect, a method of applying a stator coil around a stator tooth. The method comprises using a 3D printer to print a plurality of alternating layers of insulation and electrically conductive metal around the tooth, coupling a first electrical connector to a first of the layers of electrically conductive metal, and coupling a second electrical connector to a final of the layers of electrically conductive metal.

The invention provides, in yet another aspect, a method of applying a stator coil around a stator tooth. The method comprises applying a full turn of insulation around the tooth, applying a first turn of electrically conductive metal around the full turn of insulation, and applying a second half turn of electrically conductive metal around the full turn of insulation, such that the first and second half turns of electrically conductive metal together form a full turn of electrically conductive metal around the full turn of insulation. The method further comprises electrically connecting the first half turn of electrically conductive metal to the second half turn of electrically conductive metal.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
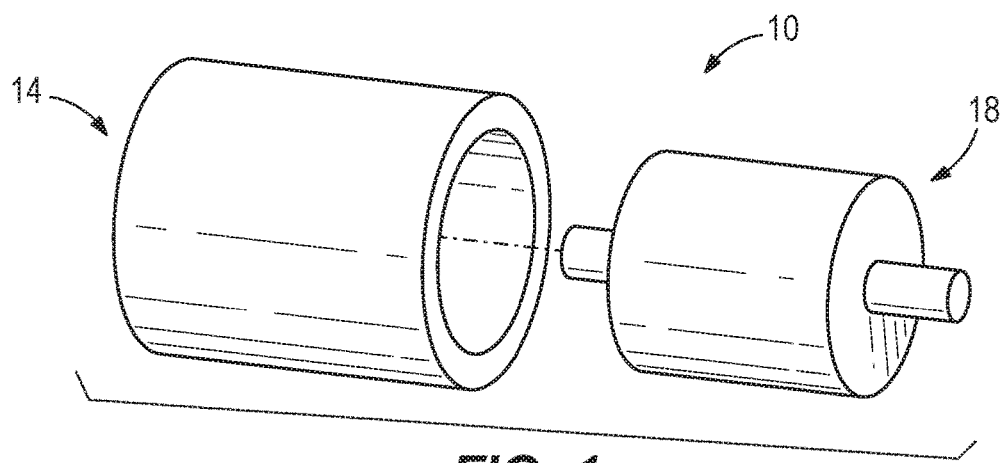
FIG. 1 is an exploded, schematic view of an electric motor.

FIG. 1 schematically illustrates a brushless direct current (DC) motor 10 for, e.g., a power tool. The electric motor 10 includes a stator 14 and a rotor 18. In operation, current is passed through windings in the stator 14 to produce a magnetic field that causes the rotor 18 to rotate, as is well known in the art. As described in more detail below, this invention includes a plurality different stators and ways of winding the stator 14.

Figure 2:
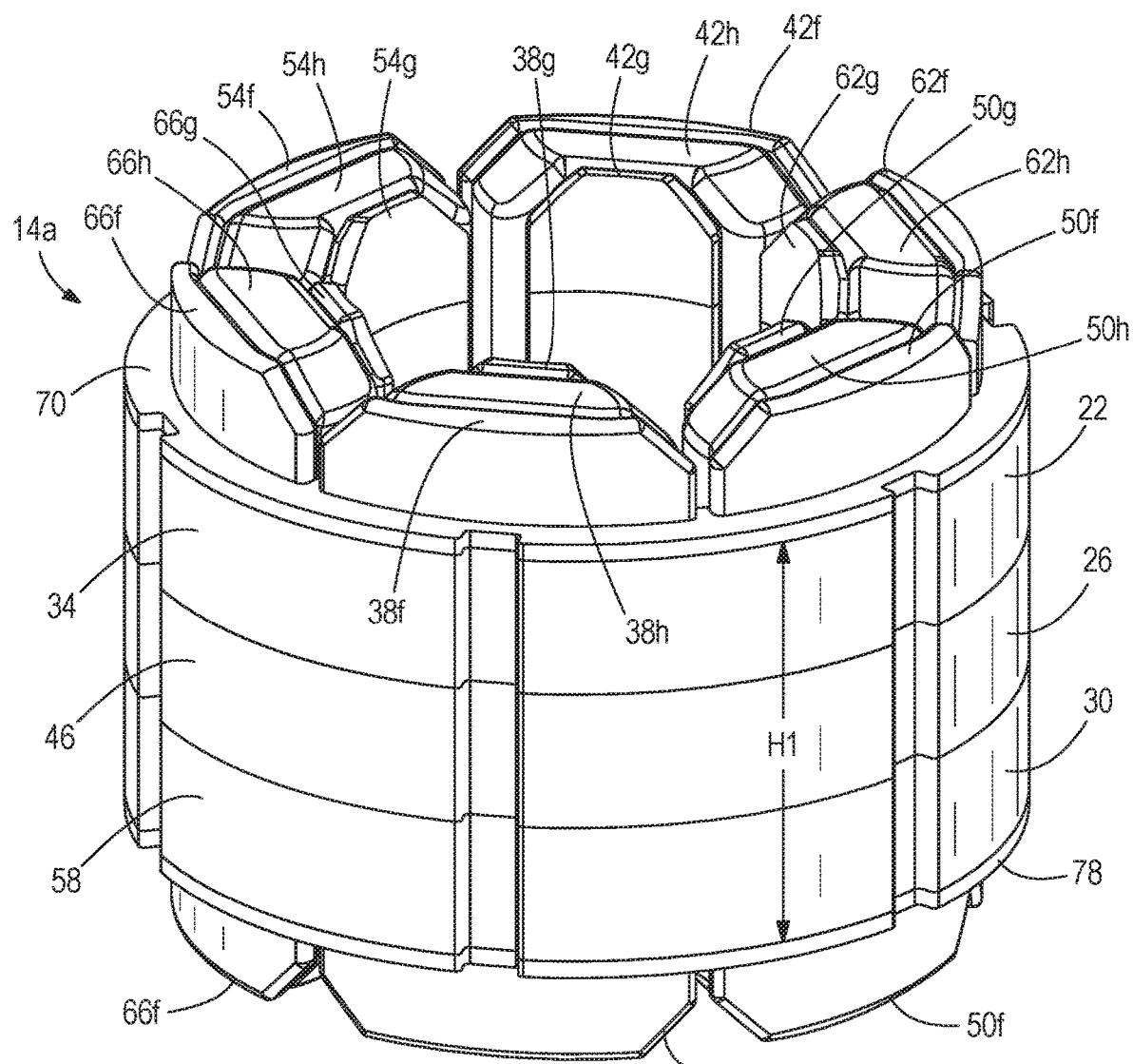
FIG. 2 is a perspective view of an embodiment of a stator of the electric motor of FIG. 1.
Figure 3:
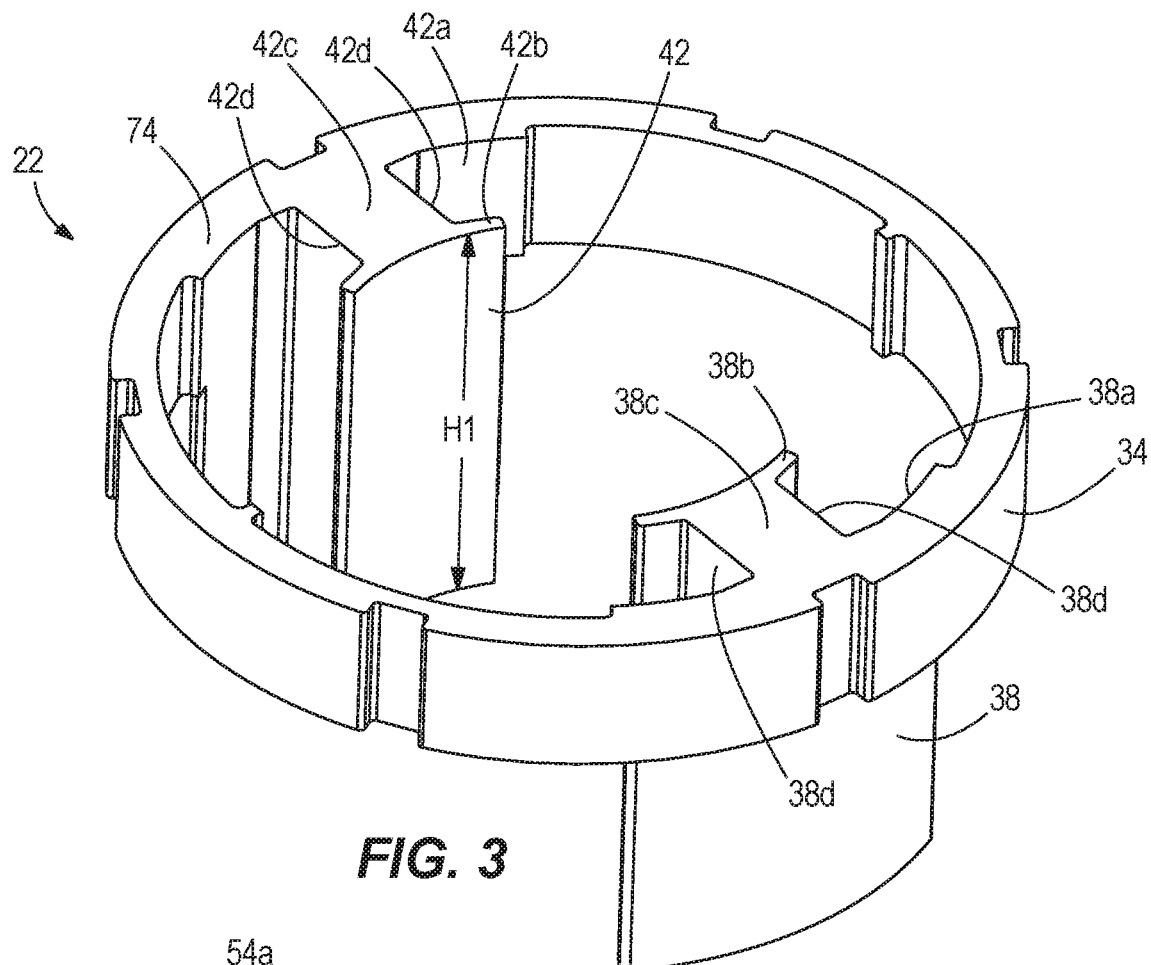
FIG. 3 is a perspective view of a first stator segment of the stator of FIG. 2.
Figure 4:
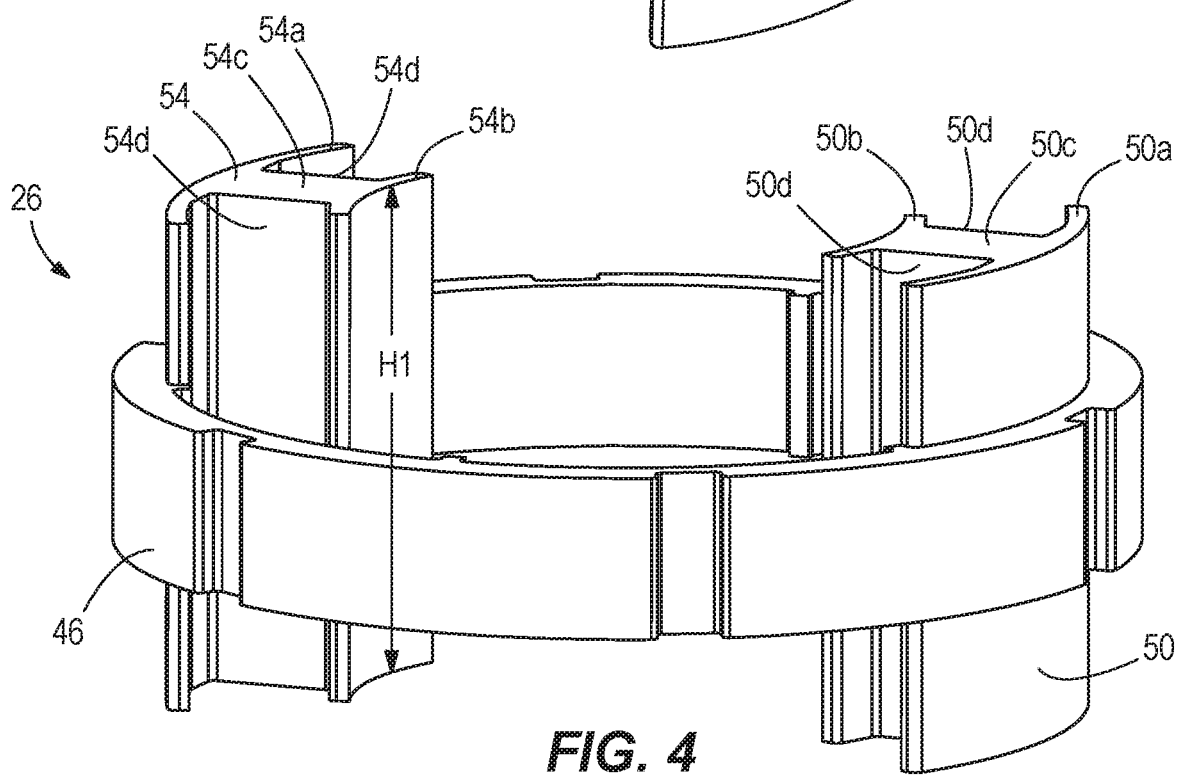
FIG. 4 is a perspective view of a second stator segment of the stator of FIG. 2.
Figure 5:
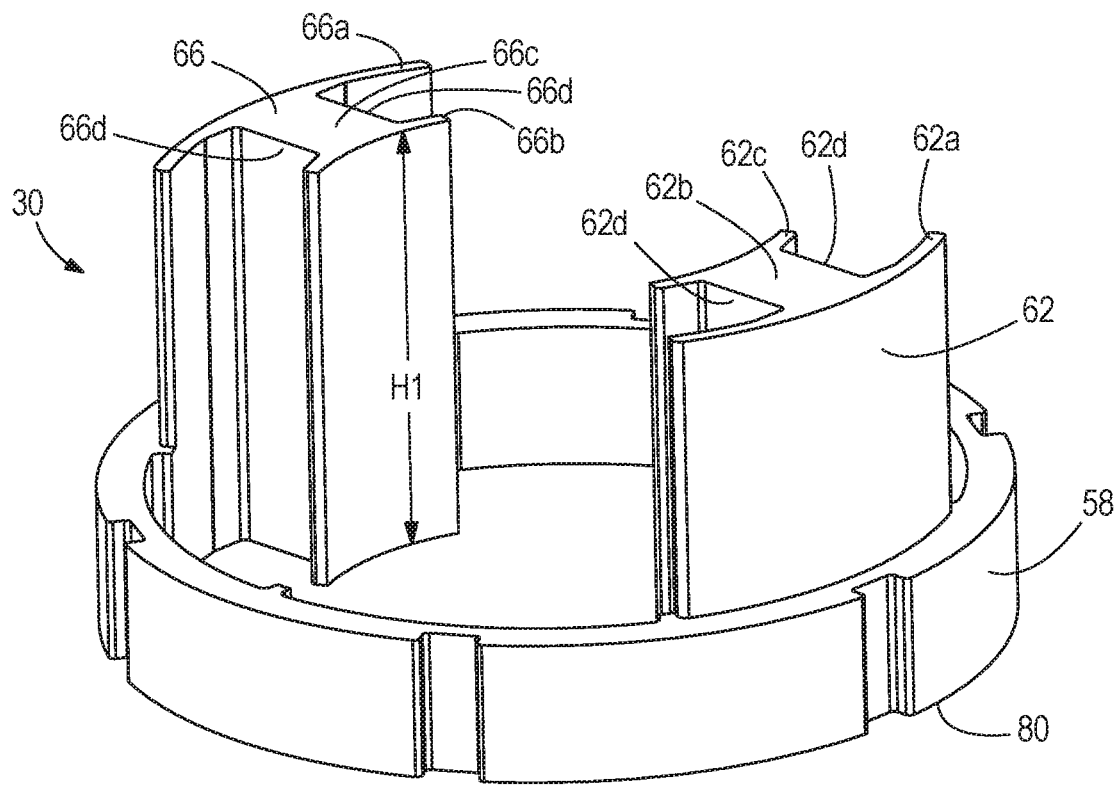
FIG. 5 is a perspective view of a third stator segment of the stator of FIG. 2.

FIG. 2 illustrates an embodiment of the stator including a three-part stator 14*a*. The stator 14*a* is a three-phase stator. The stator 14*a* includes a first stator segment 22 (FIG. 3), a second stator segment 26 (FIG. 4), and a third stator segment 30 (FIG. 5). The first stator segment 22 (FIG. 3) includes a first annular back portion 34 and a first tooth 38 and a second tooth 42 that each extend radially inward from the first back portion 34 and axially away from the first back portion 34 in a first direction. The first and second teeth 38, 42 each have a first height H1. The second stator segment 26 (FIG. 4) includes a second annular back portion 46 and a third tooth 50 and a fourth tooth 54 that each extend radially inward from the second back portion 46 and axially away from the second back portion 46 in the first direction and a second direction that is opposite the first direction. Like the first and second teeth 38, 42, the third and fourth teeth 50, 54 also each have the first height H1.

The third stator segment 30 (FIG. 5) includes a third annular back portion 58 and a fifth tooth 62 and a sixth tooth 66 that each extend radially inward from the third back portion 58 and axially away from the third back portion 58 in the second direction. Like the first, second, third, and fourth teeth 38, 42, 50, 54 the fifth and sixth teeth 62, 66 also each have the first height H1. In some embodiments, each of the back portions 34, 46, 58 can be produced in the same progressive stamping die process. In some embodiments, the teeth 38, 42, 50, 54, 62, 66 are fixed to the respective back portions 34, 46, 58 with staking during the progressive stamping die process.

Each of the teeth 38, 42, 50, 54, 62, 66 respectively have outer flanges 38*a*, 42*a*, 50*a*, 54*a*, 62*a*, 66*a*, inner flanges 38*b*, 42*b*, 50*b*, 54*b*, 62*b*, 66*b*, and spoke portions 38*c*, 42*c*, 50*c*, 54*c*, 62*c*, 66*c* coupling the inner flanges 38*b*, 42*b*, 50*b*, 54*b*, 62*b*, 66*b* to the outer flanges 38*a*, 42*a*, 50*a*, 54*a*, 62*a*, 66*a*, such that slots 38*d*, 42*d*, 50*d*, 54*d*, 62*d*, 66*d* are respectively defined between the outer flanges 38*a*, 42*a*, 50*a*, 54*a*, 62*a*, 66*a* and inner flanges 38*b*, 42*b*, 50*b*, 54*b*, 62*b*, 66*b* on both sides of the spokes 38*c*, 42*c*, 50*c*, 54*c*, 62*c*, 66*c*.

Figure 6:
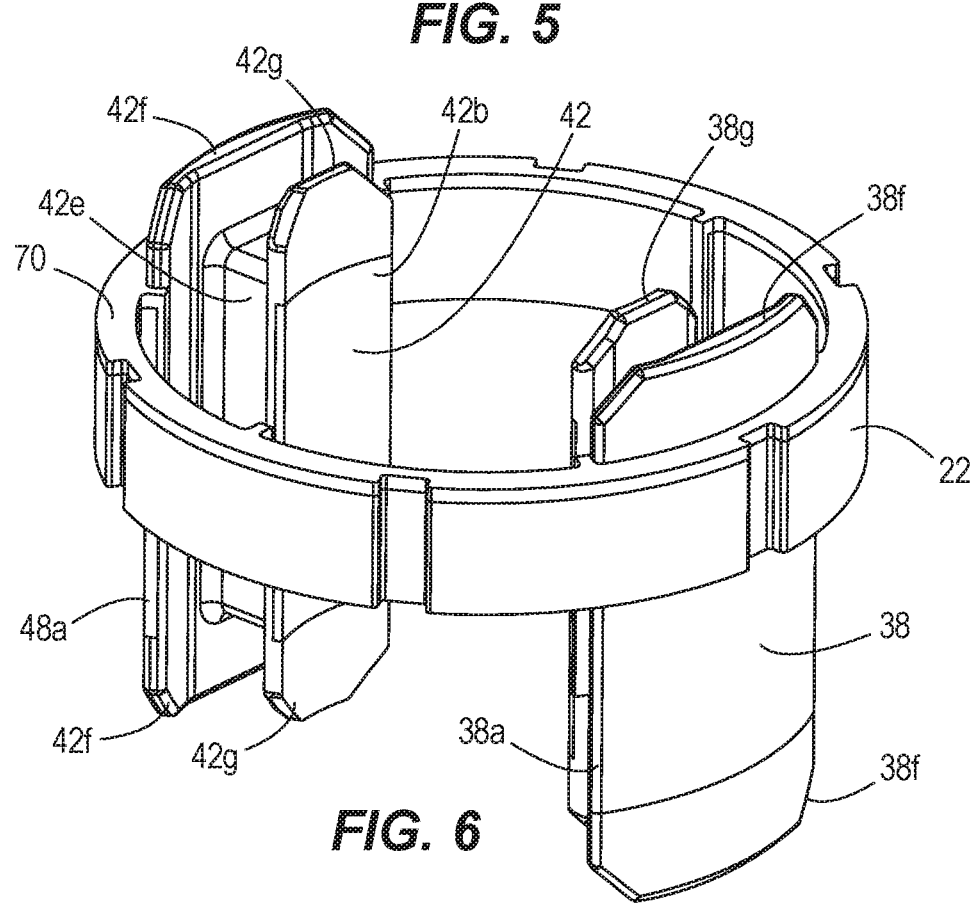
FIG. 6 is a perspective view of the first stator segment of FIG. 3 with insulation added.

After each of the first, second, and third stator segments 22, 26, 30 have been separately formed, the stator 14*a* can be assembled in the following manner. As shown in FIG. 6, first and second layers of insulation 38*e*, 42*e* are respectively applied about the first and second teeth 38, 42 of the first stator segment 22. Specifically, the first and second layers of insulation 38*e*, 42*e* respectively cover portions of the outer flanges 38*a*, 42*a*, the inner flanges 38*b*, 42*b* and the spoke portions 38*c*, 42*c* of the first and second teeth 38, 42. Also, the first and second layers of insulation 38*e*, 42*e* respectively include first and second outer bookends 38*f*, 42*f* that extend axially from the top and bottom portions of the outer flanges 38*a*, 42*a*. The first and second layers of insulation 38*e*, 42*e* also respectively include first and second inner bookends 38*g*, 42*g* that extend axially from the top and bottom portions of the inner flanges 38*b*, 42*b*. In addition, a first insulation end cap 70 is applied to a first axial end 74 of the first back portion 34. In some embodiments, the first insulation end cap 70 is formed with the first and second layers of insulation 38*e*, 42*e*, e.g. via insert molding.

Figure 7:
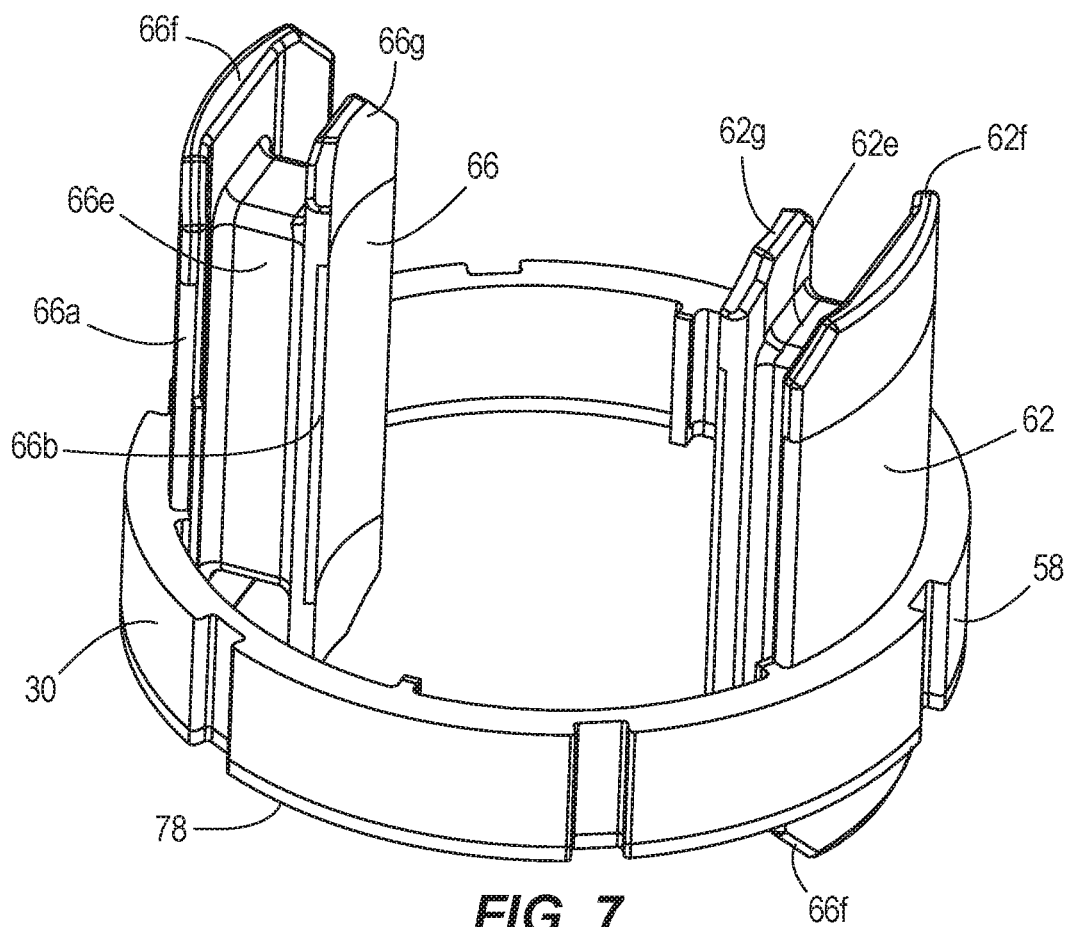
FIG. 7 is a perspective view of the third stator segment of FIG. 5 with insulation added.
Figure 8:
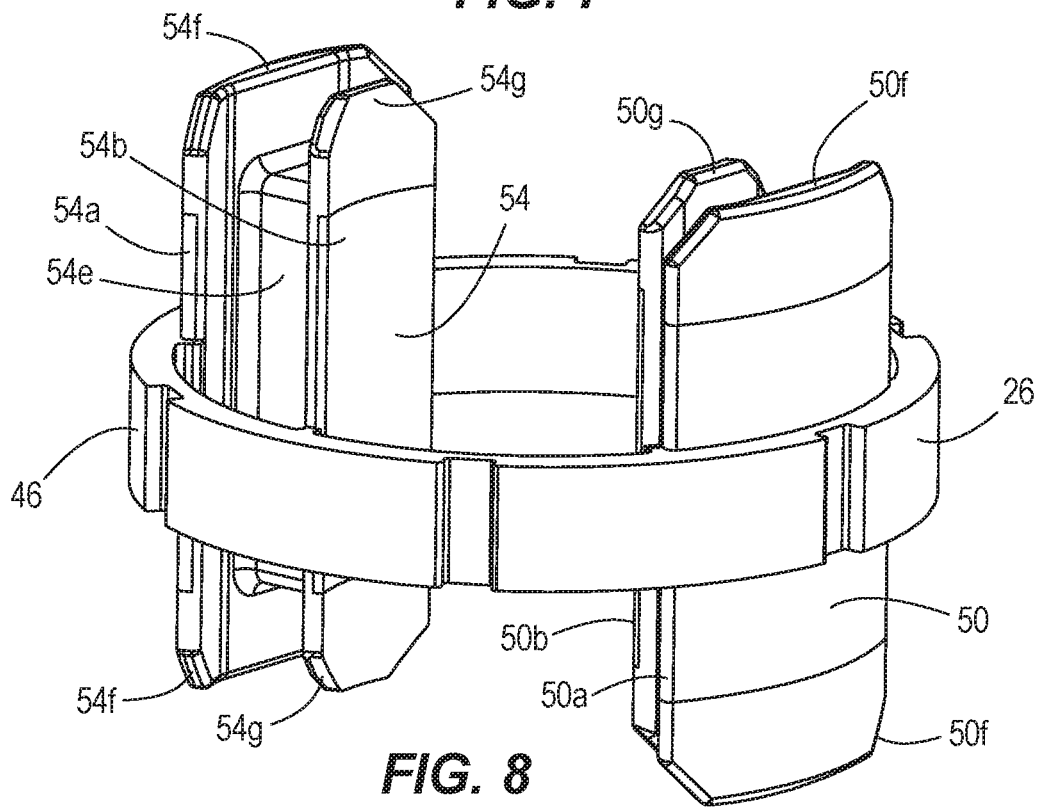
FIG. 8 is a perspective view of the second stator segment of FIG. 4 with insulation added.

As show in FIG. 7, in a manner similar to the first and second layers of insulation 38*e*, 42*e* and the first insulation end cap 70 being applied to the first stator segment 22, fifth and sixth layers of insulation 62*e*, 66*e* are respectively applied about the fifth and sixth teeth 62, 66 of the third stator segment 30, and a second insulation end cap 78 is applied to a second axial end 80 of the third back portion 58. In some embodiments, the second insulation end cap 78 is formed with the fifth and sixth layers of insulation 62*e*, 66*e*. As shown in FIG. 8, in a manner similar to the first and second layers of insulation 38*d*, 42*d* being applied to the first and second teeth 38, 42 of the first stator segment 22, third and fourth layers of insulation 50*e*, 54*e* are respectively applied about the third and fourth teeth 50, 54 of the second stator segment 26, but no end cap is formed on the second stator segment 26.

Figure 9:
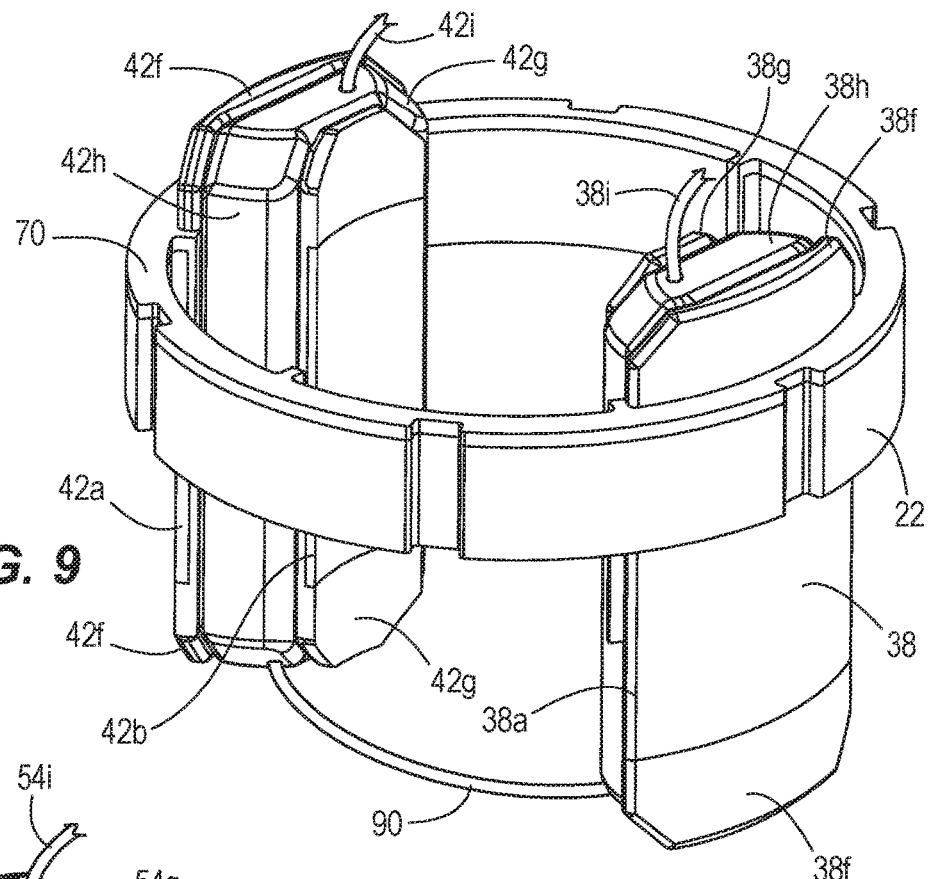
FIG. 9 is a perspective view of the first stator segment of FIG. 3 with insulation and first and second stator coils added.

Next, as shown in FIG. 9, a first stator coil 38*h* is wound around the insulated first tooth 38 or more specifically, the insulated spoke portion 38*c* of the first tooth 38. In some embodiments, the first stator coil 38*h* is a winding of electrically conductive metal, such as a copper winding. Because the only other tooth on the first stator segment 22 is the second tooth 42, which is 180 degrees away from the first tooth 38, the first stator coil 38*h* is advantageously able to fill or substantially fill the slots 38*d* on the first tooth 38. In other words, because there are no teeth immediately adjacent the first tooth 38 of the first stator segment 22, during the winding process of the first stator coil 38*h*, there is no other structure inhibiting the first stator coil 38*h* from being wound about the first tooth 38 until the first stator coil 38*h* is flush with or even wound past the outer flange 38*a* in a circumferential direction. The first outer bookend 38*f* and the first inner bookend 38*g* radially secures the portions of the first stator coil 38*h* that respectively extend above and below the first tooth 38, such that the first stator coil 38*h* can be wound to a second total height H2 that is longer than the first height H1.

Likewise, as shown in FIG. 9, a second stator coil 42*h* is wound around the insulated second tooth 42 in the same manner that the first stator coil 38*h* was wound around the first tooth 38. A first crossover wire 90 is used to electrically connect the first and second stator coils 38*h*, 42*h*. In some embodiments, the first crossover wire 90 may simply be a continuation of the first stator coil 38*h* that is continued over to the second tooth 42 to begin the second stator coil 42*h* winding process. The first stator coil 38*h* has a first end wire portion 38*i* and the second stator coil 42*h* has a second end wire portion 42*i*. The first and second end wire portions 38*i*, 42*i* are electrically connected to a power source, such that the first and second stator coils 38*h*, 42*h* can transmit current to form a first phase of the three phase stator 14*a*.

Figure 10:
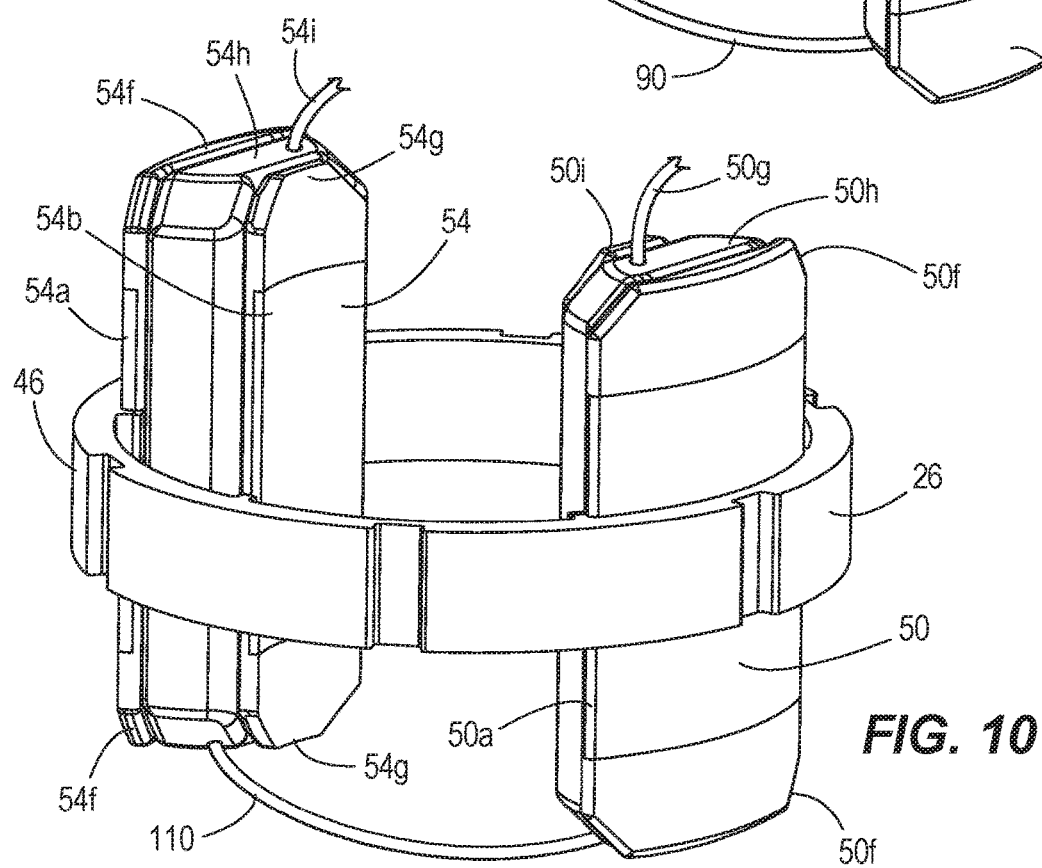
FIG. 10 is a perspective view of the second stator segment of FIG. 4 with insulation and third and fourth stator coils added.

As shown in FIG. 10, in a manner similar to the first and second stator coils 38*h*, 42*h* being wound around the first and second teeth 38, 42 of the first stator segment 22, third and fourth stator coils 50*h*, 54*h* are respectively wound around the insulated third and fourth teeth 50, 54 of the second stator segment 26. A second crossover wire 110 is used to electrically connect the third and fourth stator coils 50*h*, 54*h*. In some embodiments, the second crossover wire 110 may simply be a continuation of the third stator coil 50*h* that is continued over to the fourth tooth 54 to begin the fourth stator coil 54*h* winding process. The third stator coil 50*h* has a third end wire portion 50*i* and the fourth stator coil 54*h* has a fourth end wire portion 54*i*. The third and fourth end wire portions 50*i*, 54*i* are electrically connected to a power source, such that the third and fourth stator coils 50h, 54h can transmit current to form a second phase of the three phase stator 14a.

Figure 11:
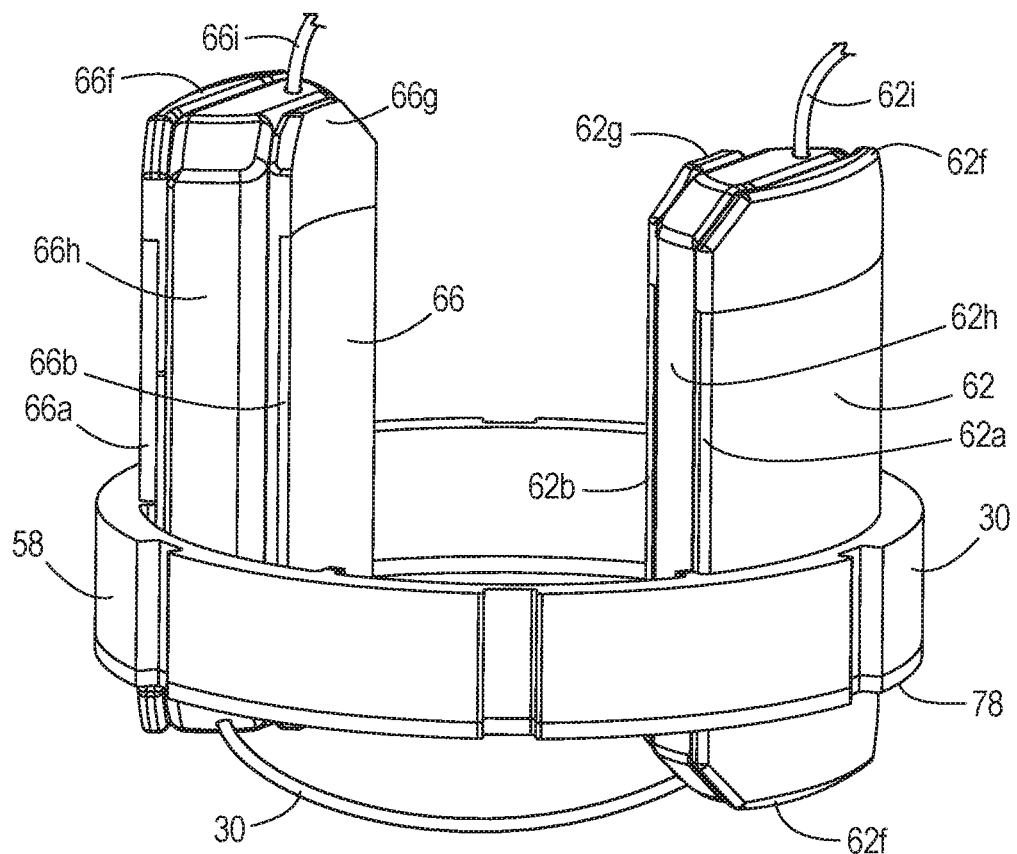
FIG. 11 is a perspective view of the third stator segment of FIG. 5 with insulation and fifth and sixth stator coils added.

As shown in FIG. 11, in a manner similar to the first and second stator coils 38h, 42h being wound around the first and second teeth 38, 42 of the first stator segment 22, fifth and sixth stator coils 62h, 66h are respectively wound around the insulated fifth and sixth teeth 62, 66 of the third stator segment 30. A third crossover wire 130 is used to electrically connect the fifth and sixth stator coils 62h, 66h. In some embodiments, the third crossover wire 130 may simply be a continuation of the fifth stator coil 62h that is continued over to the sixth tooth 62 to begin the sixth stator coil 66h winding process. The fifth stator coil 62h has a fifth end wire portion 62i and the sixth stator coil 66h has a sixth end wire portion 66i. The fifth and sixth end wire portions 62i, 66i are electrically connected to a power source, such that the fifth and sixth stator coils 62h, 66h can transmit current to form a third phase of the three phase stator 14a.

Figure 12:
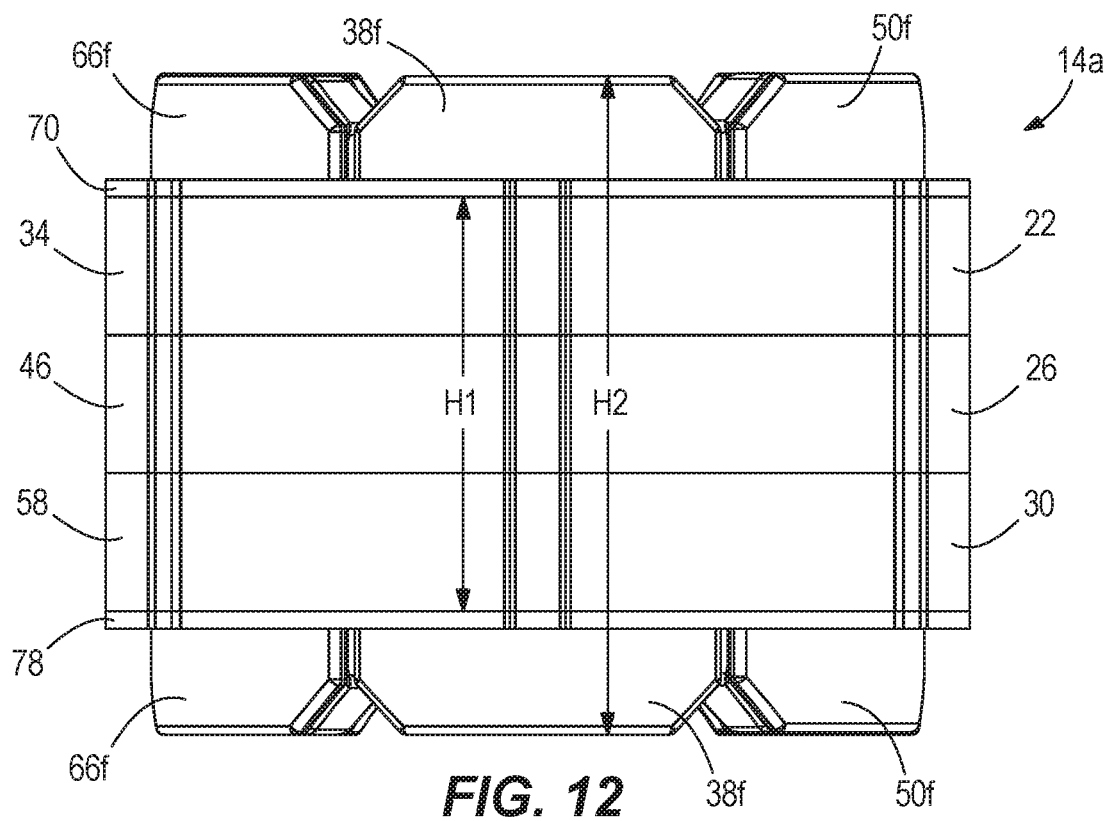
FIG. 12 is a plan view of the first, segment, and third stator segments of FIGS. 9-11 axially coupled together.

Next, as shown in FIG. 12, the first stator segment 22 is axially coupled to the second stator segment 26 in a manner such that the first and second teeth 38, 42 are circumferentially offset from the third and fourth teeth 50, 54. Similarly, the third stator segment 30 is axially coupled to the second stator segment 26 on a side of the second stator segment 26 that is opposite the first stator segment 22, such that the fifth and sixth teeth 62, 66 are circumferentially offset from the first, second, third, and fourth teeth 38, 42, 50, 54. In some embodiments, the first and third stator segments 22, 30 are axially coupled to the second stator segment 26 via welding of the respective first, second, and third back portions 34, 46, 58. However, in other embodiments, the back portions 34, 46, 58 have mating portions 140, such as reciprocal recess and protrusion arrangements, that permit the back portions 34, 46, 58 to be snap fit together. As shown in FIG. 12, when stacked together, the first, second, and third back portions 34, 46, 58 collectively have the first height H1.

Figure 13:
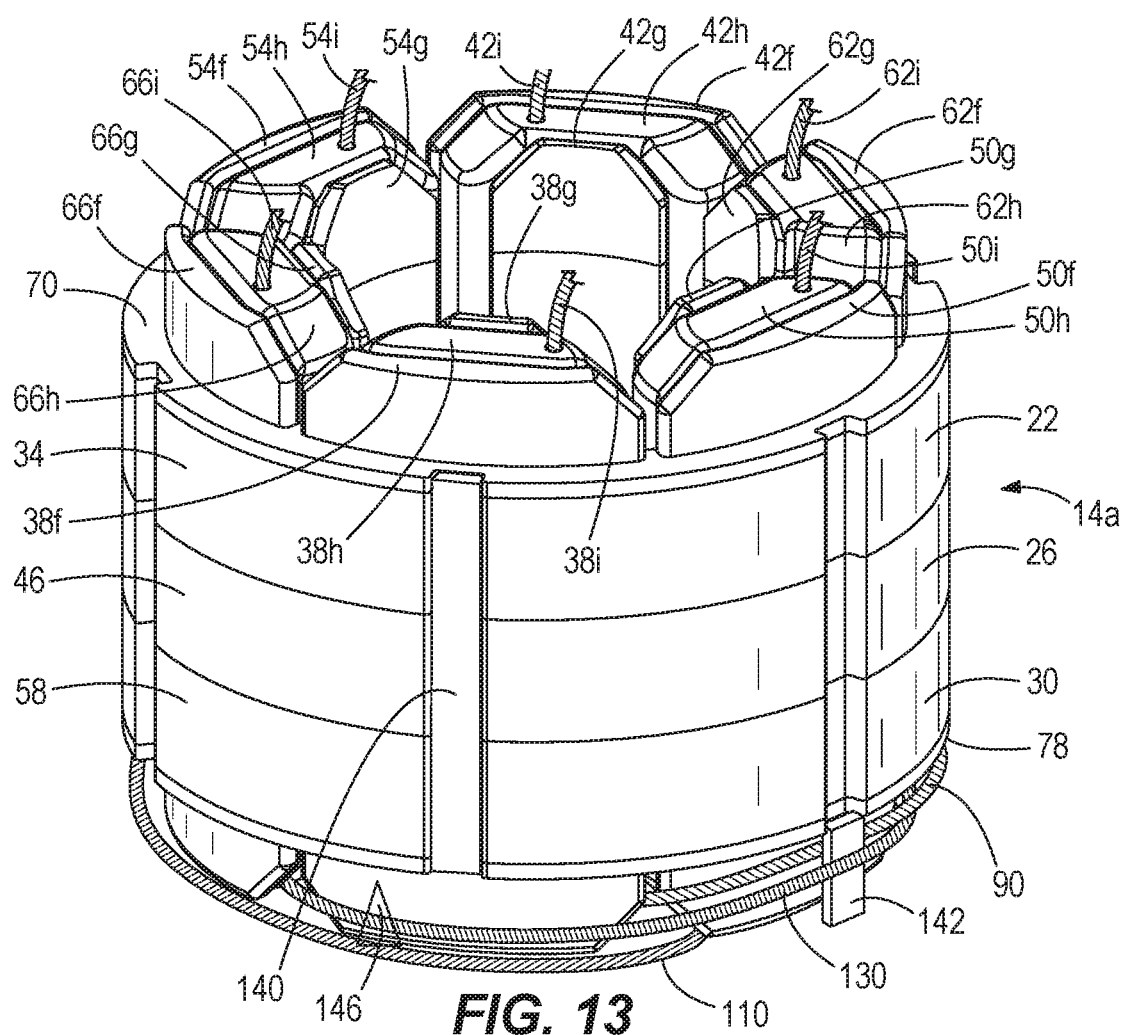
FIG. 13 is a perspective view of the stator of FIG. 2.

As shown in FIG. 13, the crossover wires 90, 110, 130 are routed adjacent to the third back portion 58. In some embodiments, the second insulation end cap 78 may include hooks 142 and/or notches 146 to support the crossover wires 90, 110, 130 as they are routed to be adjacent to the third back portion 58. The stator 14a is then assembled and ready to be implemented as part of the motor 10.

Figure 14:
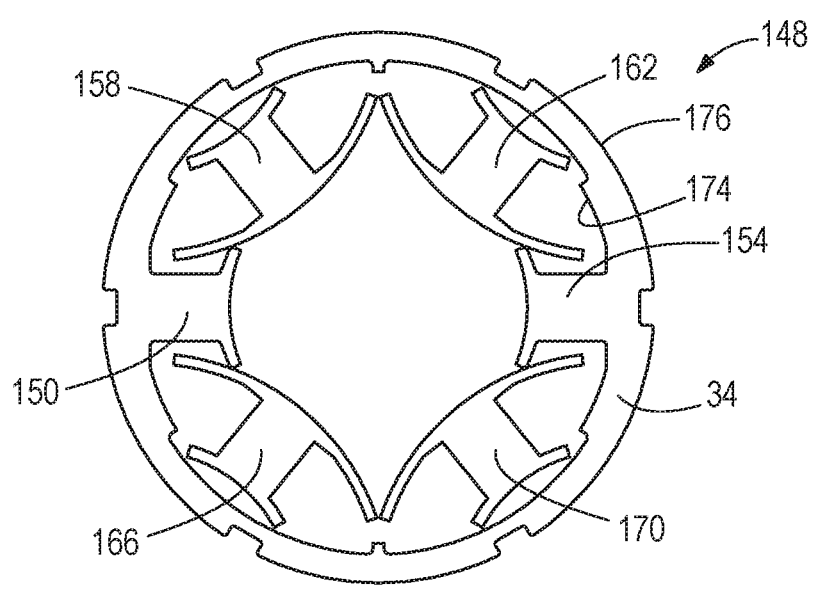
FIG. 14 is a plan view of a die stamping cross section.

As described above, in some embodiments, the teeth 38, 42, 50, 54, 62, 66 are fixed to their respective back portions 34, 46, 58 with staking during the progressive stamping die process. In other embodiments, a stamping cross section 148 can include a first tooth portion 150 and a fourth tooth portion 154 included as part of the first back portion 34, as well as second, third, fifth, and sixth tooth portions 158, 162, 166, 170 nested within an inner diameter 174 of the first back portion 34, as shown in FIG. 14. In other embodiments, the second, third, fifth, and sixth tooth portions 158, 162, 166, 170 can be arranged outside an outer diameter 176 of the first back portion 34.

Figure 15:
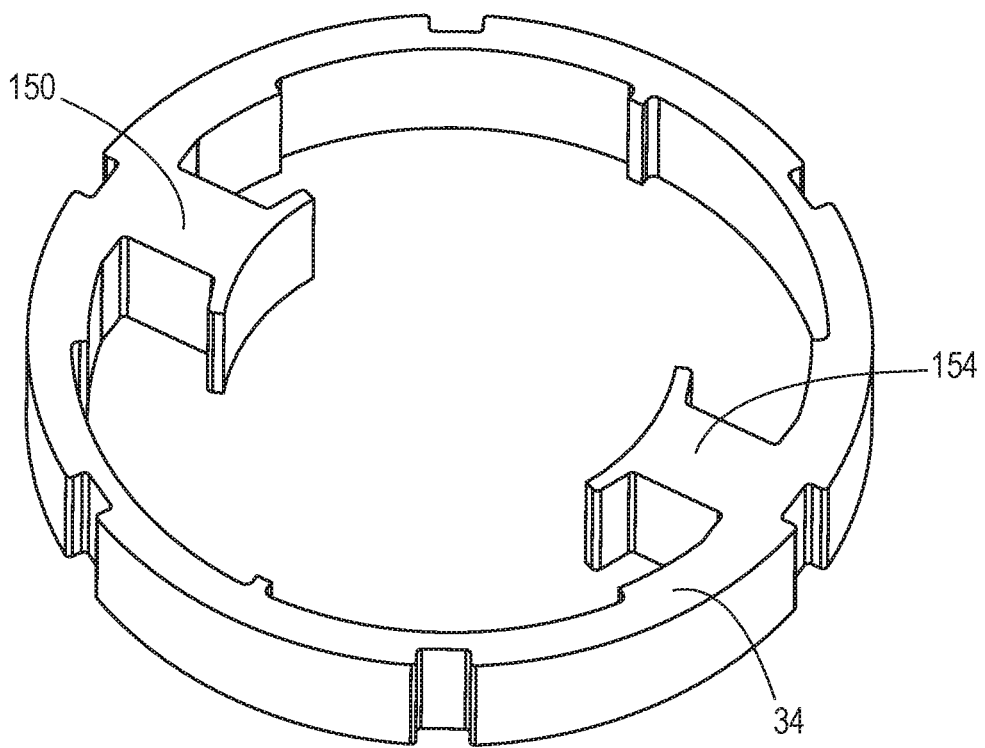
FIG. 15 is a perspective view of a partial stator segment resulting from a die stamping process using the die stamping cross section of FIG. 14.
Figure 16:
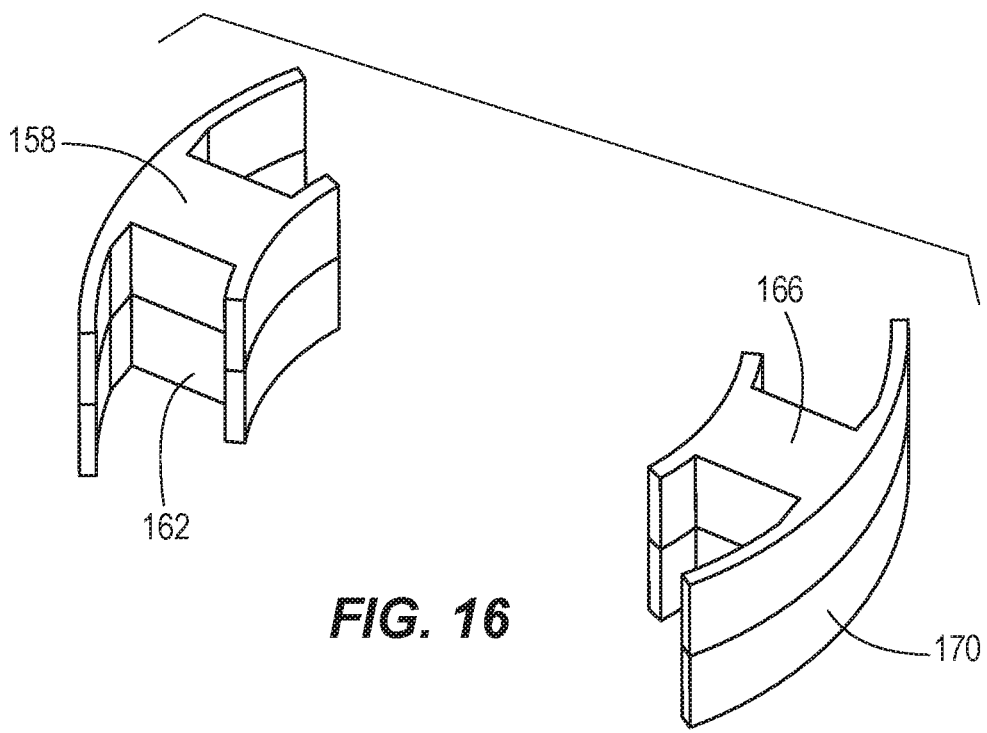
FIG. 16 is a perspective view of a pair of tooth portions resulting from a die stamping process using the die stamping cross section of FIG. 14.

Thus, after stamping, the first back portion 34 includes the first and fourth tooth portions 150, 154, as shown in FIG. 15, and the second, third, fifth, and sixth tooth portions 158, 162, 166, 170 have been separately stamped out, with the second, and fifth tooth portions 158, 166 shown in FIG. 16. Then, the second and third tooth portions 158, 162 can be coupled to the first tooth portion 150 via welding, staking, insert molding, bolting or other methods to form the first tooth 38. Likewise, the fifth and sixth tooth portions 166, 170 can be coupled to the third tooth portion 154 via welding, staking, insert molding, bolting or other methods to form the second tooth 42. By nesting the second, third, fifth, and sixth tooth portions 158, 162, 166, 170 inside the inner diameter 174 or arranging them outside the outer diameter 176, material respectively inside or outside the inner and outer diameters 174, 176 of the first back portion 34 that would otherwise be scrapped after the stamping process is instead used to form the first and second teeth 38, 42.

Figure 17:
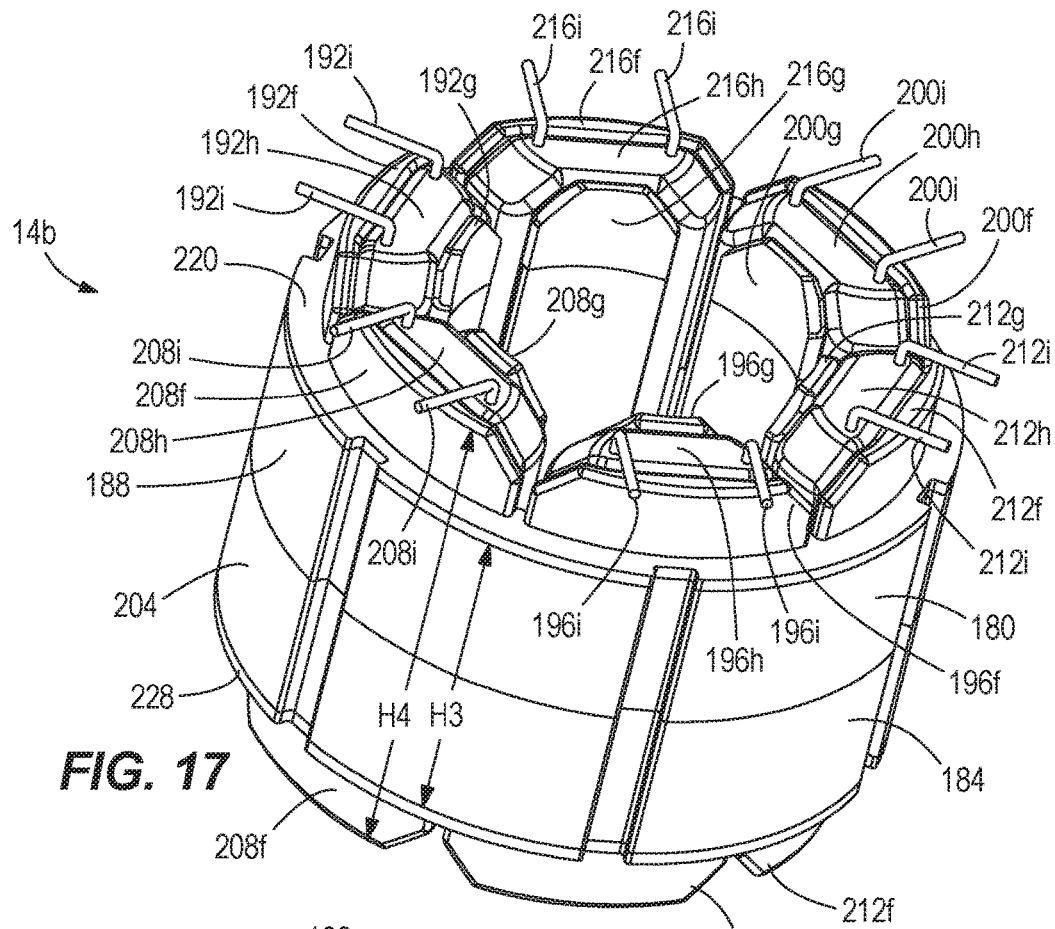
FIG. 17 is a perspective view of another embodiment of a stator of the electric motor of FIG. 1.
Figure 18:
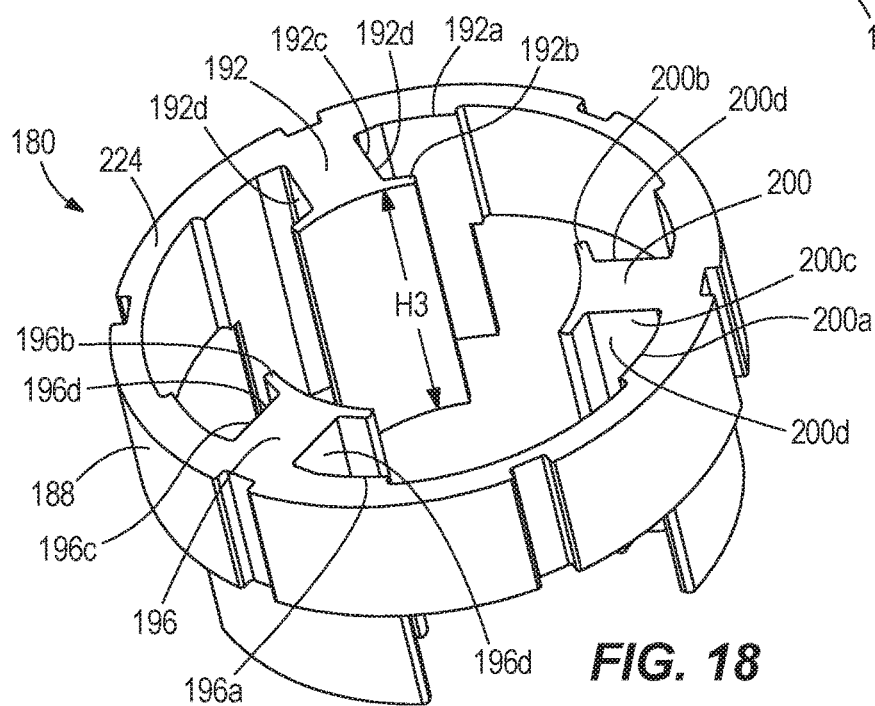
FIG. 18 is a perspective view of a first stator segment of the stator of FIG. 17.
Figure 19:
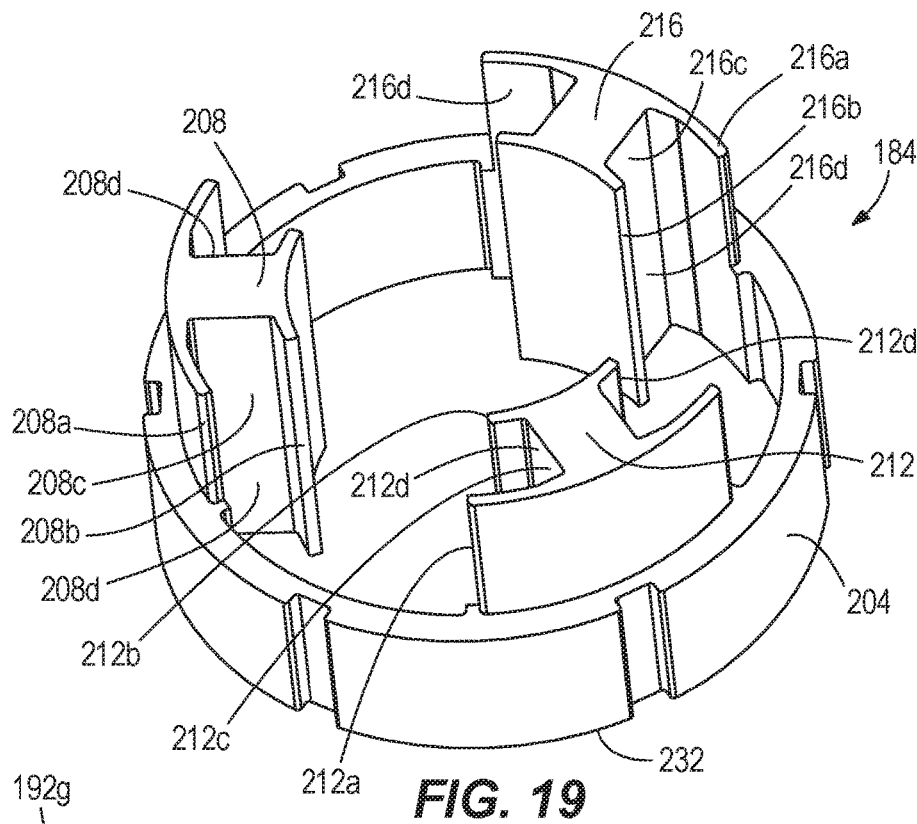
FIG. 19 is a perspective view of a second stator segment of the stator of FIG. 17.

FIG. 17 illustrates an embodiment of the stator including a two-part stator 14b. The stator 14b is also a three-phase stator. The stator 14b includes a first stator segment 180 (FIG. 18) and a second stator segment 184 (FIG. 19). The first stator segment 180 includes a first annular back portion 188 and first, second, and third teeth 192, 196, 200 that each extend radially inward from the first back portion 188 and axially away from the first back portion 188 in a first direction. The first, second, and third teeth 192, 196, 200 each have a height H3. The second stator segment 184 includes a second annular back portion 204 and fourth, fifth, and sixth teeth 208, 212, 216 that each extend radially inward from the second back portion 204 and axially away from the second back portion 204 in a second direction that is opposite the first direction. Like the first, second, and third teeth 192, 196, 200, the fourth, fifth, and sixth teeth 208, 212, 216 also each have the height H3. In some embodiments, each of the back portions 188, 204 can be produced in the same progressive stamping die process. In some embodiments, the teeth 192, 196, 200, 208, 212, 216 are fixed to the respective back portions 188, 204 with staking during the progressive stamping die process.

Each of the teeth 192, 196, 200, 208, 212, 216 respectively have outer flanges 192a, 196a, 200a, 208a, 212a, 216a proximate the respective back portions 34, 46, 58, inner flanges 192b, 196b, 200b, 208b, 212b, 216b, and spoke portions 192c, 196c, 200c, 208c, 212c, 216c respectively coupling the inner flanges 192b, 196b, 200b, 208b, 212b, 216b to the outer flanges 192a, 196a, 200a, 208a, 212a, 216a, such that slots 192d, 196d, 200d, 208d, 212d, 216d are respectively defined between the outer flanges 192a, 196a, 200a, 208a, 212a, 216a and inner flanges 192b, 196b, 200b, 208b, 212b, 216b on both sides of the spokes 38c, 42c, 50c, 54c, 62c, 66c.

Figure 20:
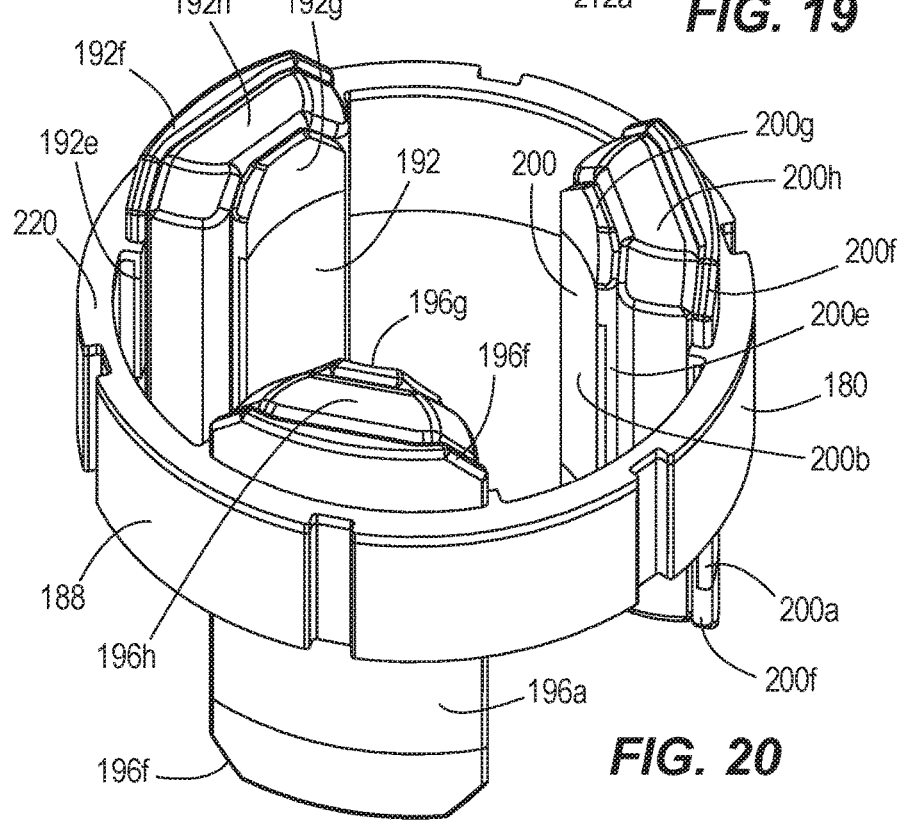
FIG. 20 is a perspective view of the first stator segment of FIG. 18 with insulation and first, second, and third stator coils added.
Figure 21:
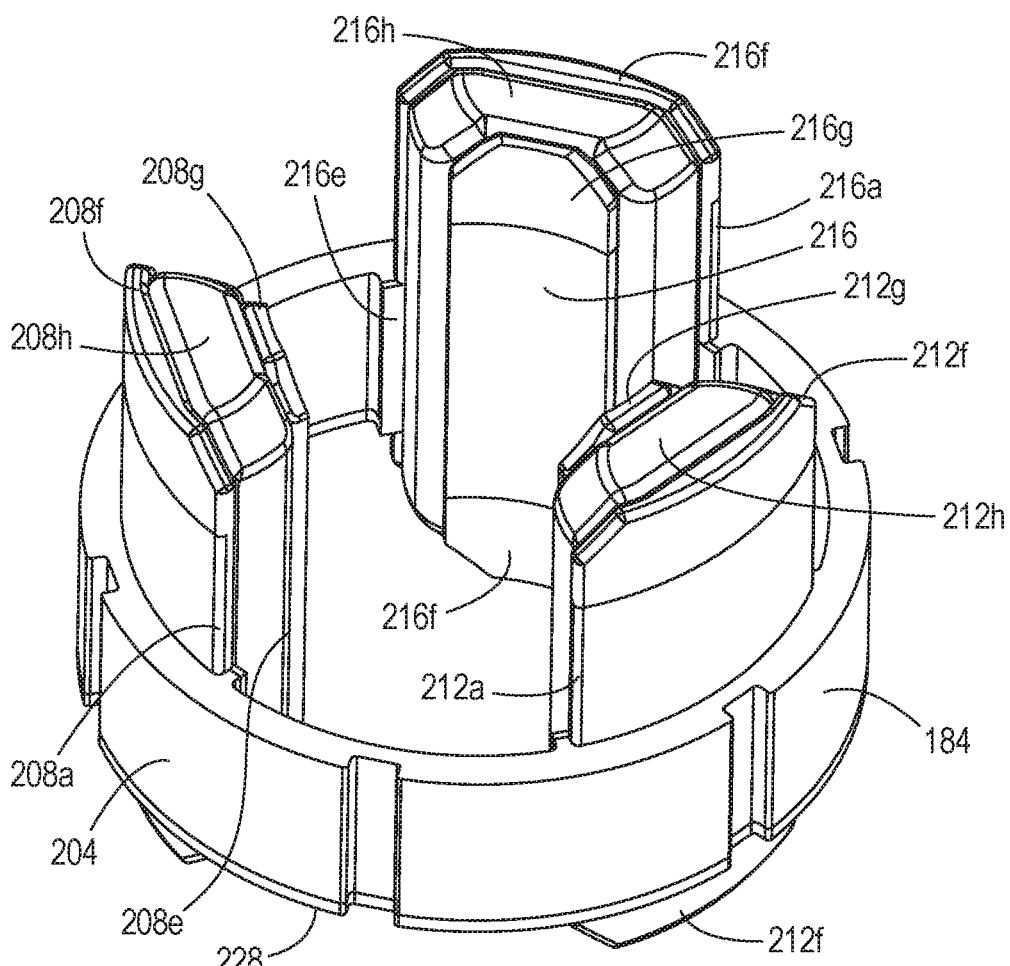
FIG. 21 is a perspective view of the second stator segment of FIG. 19 with insulation and fourth, fifth, and sixth coils added.

After each of the stator segments 180, 184 have been separately formed, the stator 14b can be assembled in the following manner. First, as shown in FIG. 20, first, second, and third layers of insulation 192e, 196e, 200e are respectively applied about the first, second, and third teeth 192, 196, 200 of the first stator segment 180. Specifically, the layers of insulation 192e, 196e, 200e respectively cover portions of the outer flanges 192a, 196a, 200a, the inner flanges 192b, 196b, 200b and the spoke portions 192c, 196c, 200c of the corresponding tooth 192, 196, 200. Also, the first, second, and third layers of insulation 192e, 196e, 200e respectively include first, second, and third outer bookends 192f, 196f, 200f that extend axially from the top and bottom portions of the outer flanges 192a, 196a, 200a. The first, second, and third layers of insulation 192e, 196e, 200e also respectively include first, second, and third inner bookends 192g, 196g, 200g that extend axially from the top and bottom portions of the inner flanges 192b, 196b, 200b. Also, a first insulation end cap 220 is applied to a first axial end 224 of the first back portion 188. In some embodiments, the first insulation end cap 220 is formed with the first, second, and third layers of insulation 192e, 196e, 200e, e.g. via insert molding. As shown in FIG. 21, in a manner similar to the first, second, and third layers of insulation 192e, 196e, 200e and the first insulation end cap 220 being applied to the first stator segment 180, fourth, fifth and sixth layers of insulation 208e, 212e, 216e are respectively applied about the fourth, fifth and sixth teeth 208, 212, 216 of the second stator segment 184, and a second insulation end cap 228 is applied to a second axial end 232 of the second back portion 204.

Next, as shown in FIG. 20, a first stator coil 192h is wound around the insulated first tooth 192 or more specifically, the insulated spoke portion 192c of the first tooth 192. In some embodiments, the first stator coil 192h is a winding of electrically conductive metal, such as a copper winding. Because the only other teeth on the first stator segment 180 are the second and third teeth 196, 200, which are each 120 degrees away from the first tooth 192, the first stator coil 192h is advantageously able to fill or substantially fill the slots 192d on the first tooth 192. In other words, because there are no teeth immediately adjacent the first tooth 192 of the first stator segment 180, during the winding process of the first stator coil 192h, there is no additional structure to inhibit the first stator coil 192h from being wound about the first tooth 192 until the first stator coil 192h is flush with or even wound past the outer flange 192a in a circumferential direction. The first outer bookend 192f and the first inner bookend 192g radially secures the portions of the first stator coil 192h that respectively extend above and below the first tooth 192, such that the first stator coil 192h can be wound to a total height H4 that is longer than the height H3 (FIG. 17).

With continued reference to FIG. 20, in a manner similar to the first stator coil 192h being wound around the insulated first tooth 192, second and third stator coils 196h, 200h are wound around the second and third insulated teeth 196, 200 of the first stator segment 180. Also, as shown in FIG. 21, in a manner similar to the first stator coil 192h being wound around the insulated first tooth 192, fourth, fifth, and sixth stator coils 208h, 212h, 216h are wound around the insulated fourth, fifth, and sixth teeth 208, 212, 216 of the second stator segment 184.

Next, as shown in FIG. 17, the first stator segment 180 is axially coupled to the second stator segment 184 in a manner such that the first, second, and third teeth 192, 196, 200 are respectively opposite the fourth, fifth and sixth teeth 208, 212, 216. In some embodiments, the first stator segment 180 is axially coupled to the second stator segment 184 via welding of the respective first and second back portions 188, 204. First, second, and third crossover wires are then used to respectively electrically connect the first and fourth stator coils 192h, 208h, the second and fifth stator coils 196h, 212h, and the third and sixth stator coils 200h, 216h.

Each of the stator coils 192h, 196h, 200h, 208h, 212h, 216h respectively has pairs of wire portions 192i, 196i, 200i, 208i, 212i, 216i. The first, second, third, fourth, fifth, and sixth end wire portions 192i, 196i, 200i, 208i, 212i, 216i may be electrically connected to each other, with another component, or directly to a power source, such that the first and fourth stator coils 192h, 208h can transmit current to form a first phase of the three phase stator 14b, the second and fifth stator coils 196h, 212h can transmit current to form a second phase of the three phase stator 14b, and the third and sixth stator coils 200h, 216h can transmit current to form a third phase of the three phase stator 14b. The stator 14b is then assembled and ready to be implemented as part of the motor 10.

Figure 22:
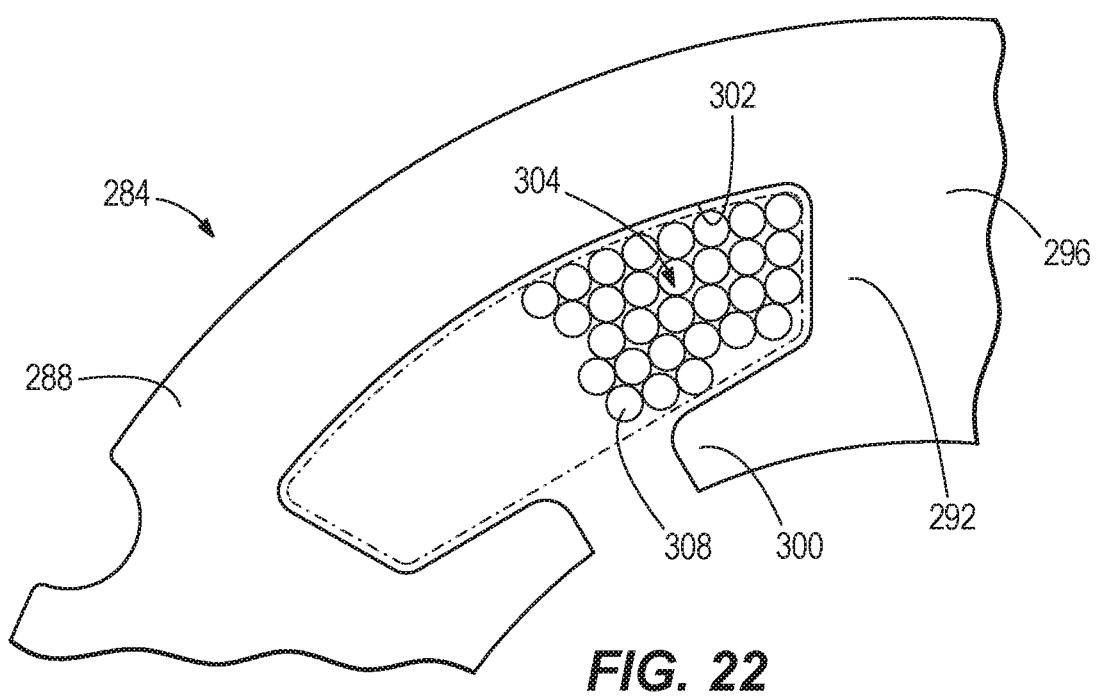
FIG. 22 is an enlarged plan view of a stator filled with a round wire.
Figure 23:
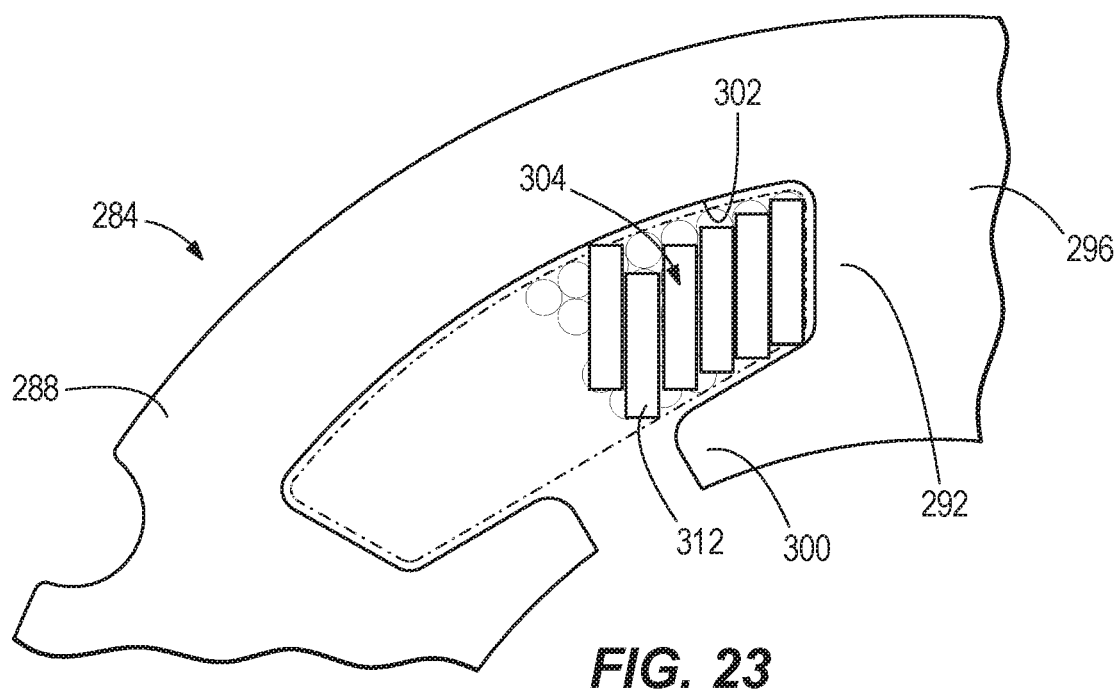
FIG. 23 is an enlarged plan view of a stator filled with a flat wire.

FIG. 22 illustrates a top-down view of a stator 284 having a back portion 288, a first tooth 292 having a spoke portion 296 and a flange 300 extending transverse to the spoke portion 296, such that a slot 302 is defined between the flange 300 and the back portion 288. A radial distance defined between the flange 300 and the back portion 288 increases along the slot 302 in a direction away from the spoke portion 296. A stator coil 304 is formed around the first tooth 292 by winding a round wire 308 around the spoke portion 296. However, as shown by FIG. 22, the winding of the round wire 308 does not substantially fill the slot 302. FIG. 23 illustrates a top-down view of the stator 284, except in the embodiment of FIG. 23, the stator coil 304 is formed around the first tooth 292 by winding a flat wire 312 around the spoke portion 296. However, as shown by FIG. 23, the winding of the flat wire 312 does not substantially fill the slot 302.

Figure 24:
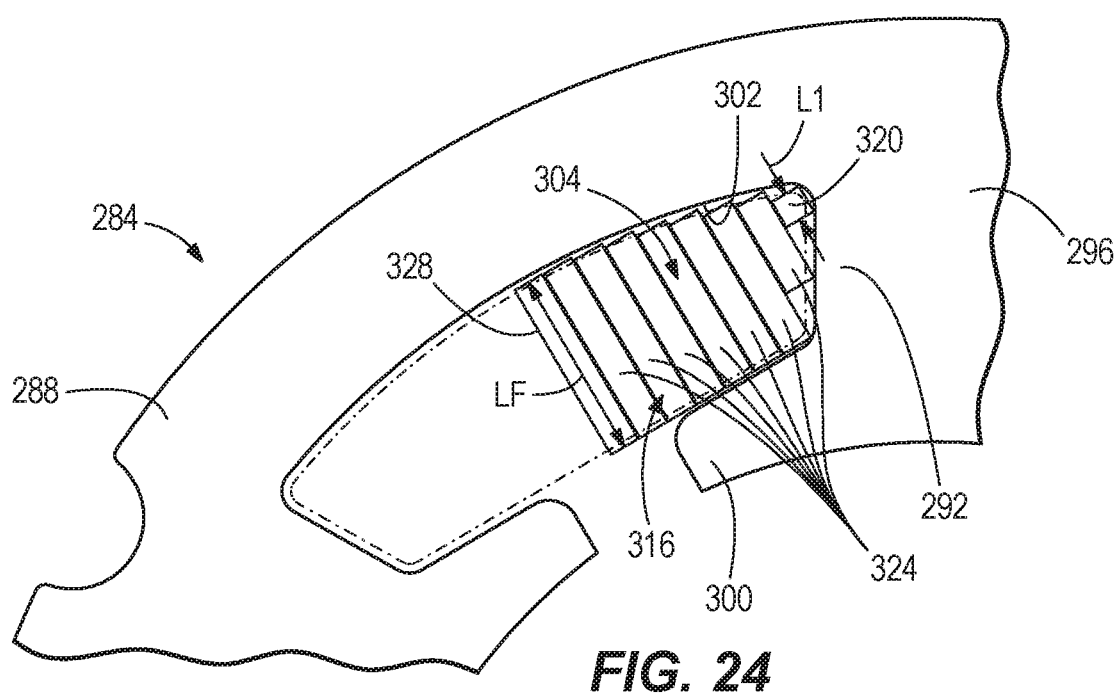
FIG. 24 is an enlarged plan view of a stator filled with a variable cross-section conductor.

FIG. 24 illustrates a top-down view of the stator 284, except in the embodiment of FIG. 24, the stator coil 304 is formed around the first tooth 292 by winding a variable-cross-section conductor 316 around the spoke portion 296. Specifically, the stator coil 304 includes a first turn 320, a plurality of intermediate turns 324, and a final turn 328 of the variable-cross-section conductor 316. As shown in FIG. 24, the final turn 328 of the variable-cross-section conductor 316 has a cross-sectional length LF that is greater than the cross-sectional length L1 of the first turn 320. Because the cross-sectional length of the variable-cross-section conductor 316 generally increases in a direction away from the spoke portion 296, the stator coil 304 can substantially or completely fill the slot 302. In some embodiments, the variable cross-section conductor 316 is applied via a 3D printer.

Figures 25, 26:
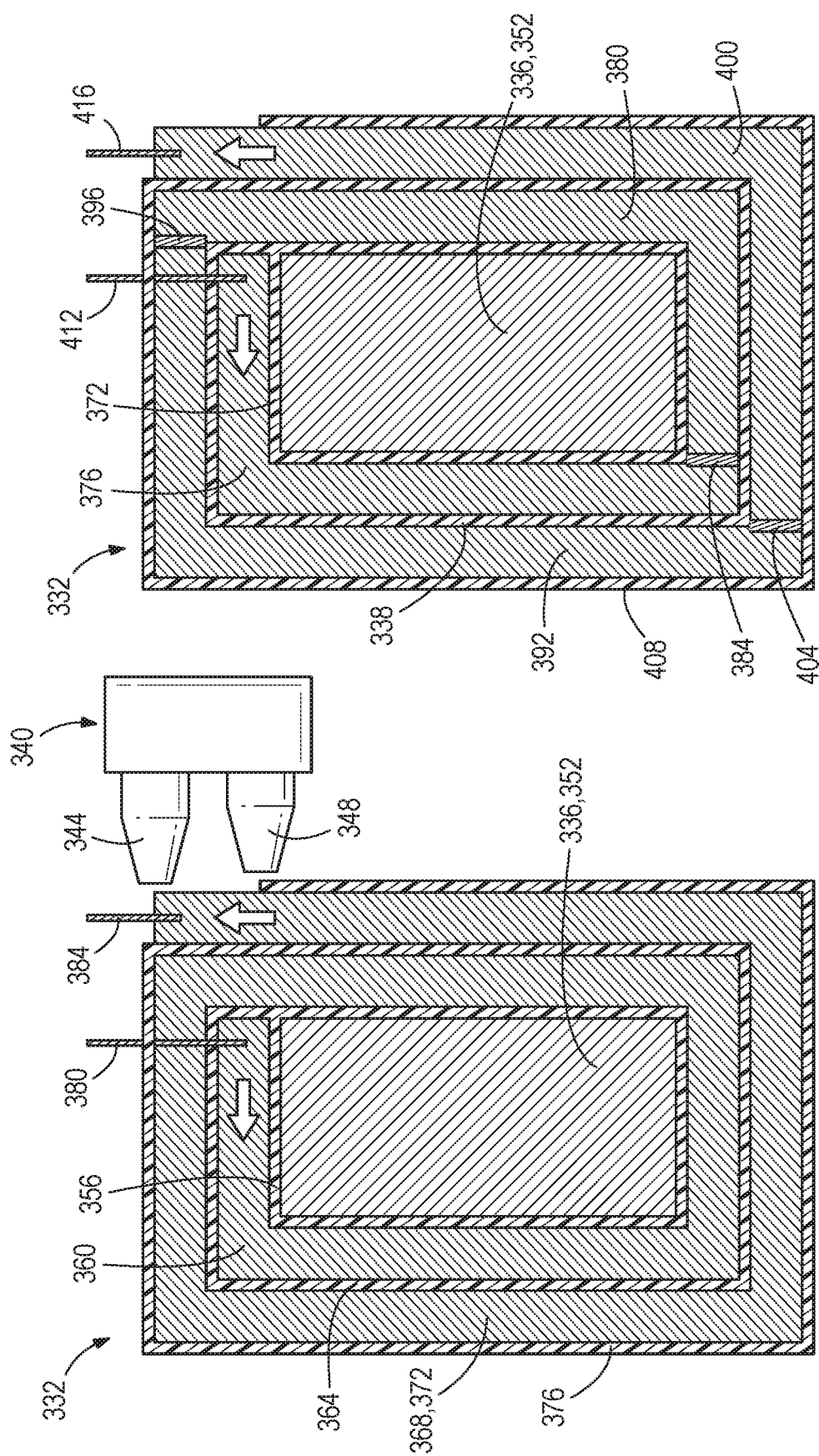
FIG. 25 is a schematic view of one method of applying a stator coil to a stator tooth.
FIG. 26 is a schematic view of another method of applying a stator coil to a stator tooth.

FIG. 25 schematically illustrates a method of applying a stator coil 332 around a tooth 336 of a stator using a 3D printer 340 with a first extrusion head 344 for applying insulation and a second extrusion head 348 for applying an electrically conductive metal, such as copper. FIG. 25 illustrates a schematic cross-sectional view of a spoke portion 352 of the tooth 336, such that the internal flange is not visible. To apply the stator coil 332 around the tooth 336, the first extrusion head 344 first prints a first layer of insulation 356 around the spoke portion 352. The second extrusion head 348 then prints a first layer of electrically conductive metal 360 around the first layer of insulation 356. The first extrusion head 344 then prints a second layer of insulation 364 around the first layer of electrically conductive metal 360. The second extrusion head 348 then prints a second layer of electrically conductive metal 368 around the second layer of insulation 364, which for purposes of this simplified example, is a final layer of electrically conductive metal 372. The first extrusion head 344 then prints a third layer of insulation 376 around the second layer of electrically conductive metal 368. A first end wire connection 380 is then coupled to the first layer of electrically conductive metal 360 and a second end wire connection 384 is coupled to the final layer of electrically conductive metal 372.

While this simplified example only include two layers of electrically conductive metal, an actual application of the method of FIG. 25 would include a greater number of alternating layers of insulation and electrically conductive metal printed by the first and second extrusion heads 344, 348. In some embodiments, the alternating layers of insulation and electrically conductive metal are printed sequentially by the first and second extrusion heads 344, 348. In some embodiments, the alternating layers of insulation and electrically conductive metal are printed substantially simultaneously by the first and second extrusion heads 344, 348. In other words, as the first extrusion head 344 is applying the first layer of insulation 356, the second extrusion head 348 is applying the first layer of electrically conductive metal 360. And then as the first extrusion head 344 is applying the second layer of insulation 364, the second extrusion head 348 is applying the second layer of electrically conductive metal 368. By using the 3D printer 340 to print alternating layers of insulation and electrically conductive metal, the slots of the teeth of a stator can be completely or substantially filled.

FIG. 26 schematically illustrates another method of applying the stator coil 332 around the tooth 336 of a stator. FIG. 26 illustrates the schematic cross-sectional view of the spoke portion 352 of the tooth 336, such that the internal flange is not visible. First, a first full-turn layer of insulation 372 is applied around the spoke portion 352. Next, a first half turn of electrically conductive metal 376 is coupled to the first layer of insulation 372. The first half turn of electrically conductive metal 376, as well as all subsequent half turns of electrically conductive metal, can be formed using any suitable manufacturing process, such as extrusion, casting, machining, or 3D printing. Next, a second half turn of electrically conductive metal 380 is coupled to the first layer of insulation 372, such that there is now a full turn of electrically conductive metal around the first layer of insulation 372. Next, a first electrical connection 384 is made between the first and second half turns of electrically conductive metal 376, 380. The first electrical connection 384, as well as all subsequent electrical connections between half turns of electrically conductive metal, can be made using any suitable electrical connection method, such as brazing, welding, fusing, or screwing.

Next, a second full-turn layer of insulation 388 is applied over the first and second half turns of electrically conductive metal 376, 380. Next, a third half turn of electrically conductive metal 392 is applied to the second layer of insulation 388 and a second electrical connection 396 is made between the second and third half turns of electrically conductive metal 380, 392. Next, a fourth half turn of electrically conductive metal 400 is applied to the second layer of insulation 388 and a third electrical connection 404 is made between the third and fourth half turns of electrically conductive metal 392, 400, such that the third and fourth half turns of electrically conductive metal 392, 400 comprise a final turn of electrically conductive metal 406 in this simplified example. Next, a third full-turn layer of insulation 408 is applied around the third and fourth half turns of electrically conductive metal 392, 400. A first end wire connection 412 is then coupled to the first half turn of electrically conductive metal 376 and a second end wire connection 416 is coupled to the final turn of electrically conductive metal 406. While this simplified example only include two full turns of electrically conductive metal made up of half turns of electrically conductive metal, an actual application of the method of FIG. 26 would include a greater number of alternating turns of insulation and electrically conductive metal. By using the method of FIG. 26 to apply alternating layers of insulation and electrically conductive metal, the slots of the teeth of a stator can be completely or substantially filled.

Figure 27:
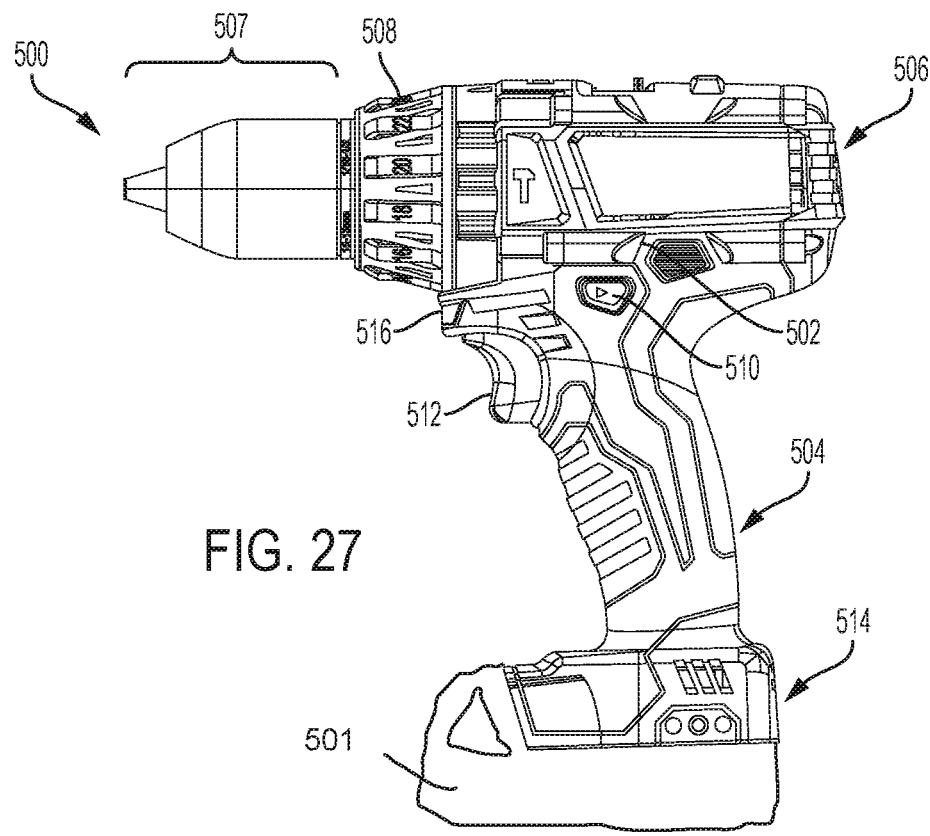
FIG. 27 is a plan view of a power tool including the electric motor of FIG. 1.

FIG. 27 illustrates a power tool 500 incorporating the BLDC motor 10 with stator 14a. In a brushless motor power tool, such as power tool 500, switching elements are selectively enabled and disabled by control signals from a controller to selectively apply power from a power source such as a battery pack 501, to drive the motor 10. In some embodiments, the battery pack 501 is a nominal 18V, 6 Amp-hour battery pack.

In some embodiments, the power tool 500 is a brushless hammer drill having a housing 502 with a handle portion 504 and motor housing portion 506. The power tool 500 further includes an output driver 507 (illustrated as a chuck), torque setting dial 508, forward/reverse selector 510, trigger 512, battery interface 514, and light 516. Although FIG. 27 illustrates a hammer drill, in some embodiments, the motors described herein are incorporated into other types of power tools including drill-drivers, impact drivers, impact wrenches, angle grinders, circular saws, reciprocating saws, string trimmers, leaf blowers, vacuums, and the like.

Figure 28:
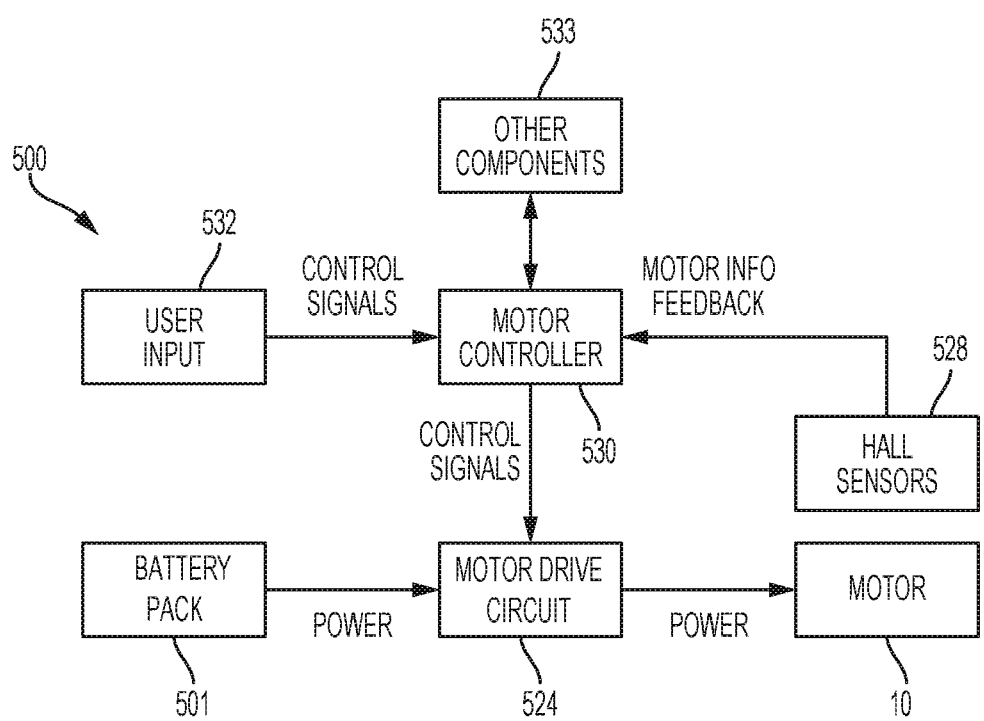
FIG. 28 is a block diagram of the power tool of FIG. 27.

FIG. 28 illustrates a simplified block diagram of the brushless power tool 500, which includes the battery pack 501, a motor drive circuit 524, the motor 10, Hall sensors 528, a motor controller 530, user input 532, and other components 533 (battery pack fuel gauge, work lights (LEDs), current/voltage sensors, etc.). The battery pack 501 provides DC power to the various components of the power tool 500 and may be a power tool battery pack that is rechargeable and uses, for instance, lithium ion cell technology. In some instances, the battery pack 501 may receive AC power (e.g., 120V/60 Hz) from a tool plug that is coupled to a standard wall outlet, and then filter, condition, and rectify the received power to output DC power. Each Hall sensor 528 outputs motor feedback information, such as an indication (e.g., a pulse) when a magnet of the rotor 18 rotates across the face of that Hall sensor 528. Based on the motor feedback information from the Hall sensors 528, the motor controller 530 can determine the position, velocity, and acceleration of the rotor 18. The motor controller 530 also receives user controls from user input 532, such as by depressing the trigger 512 or shifting the forward/reverse selector 510. In response to the motor feedback information and user controls, the motor controller 530 transmits control signals to the motor drive circuit 524 to drive the motor 10, as explained in further detail with respect to FIG. 29. Although not shown, the motor controller 530 and other components of the power tool 500 are electrically coupled to the battery pack 501 such that the battery pack 501 provides power thereto.

Figure 29:
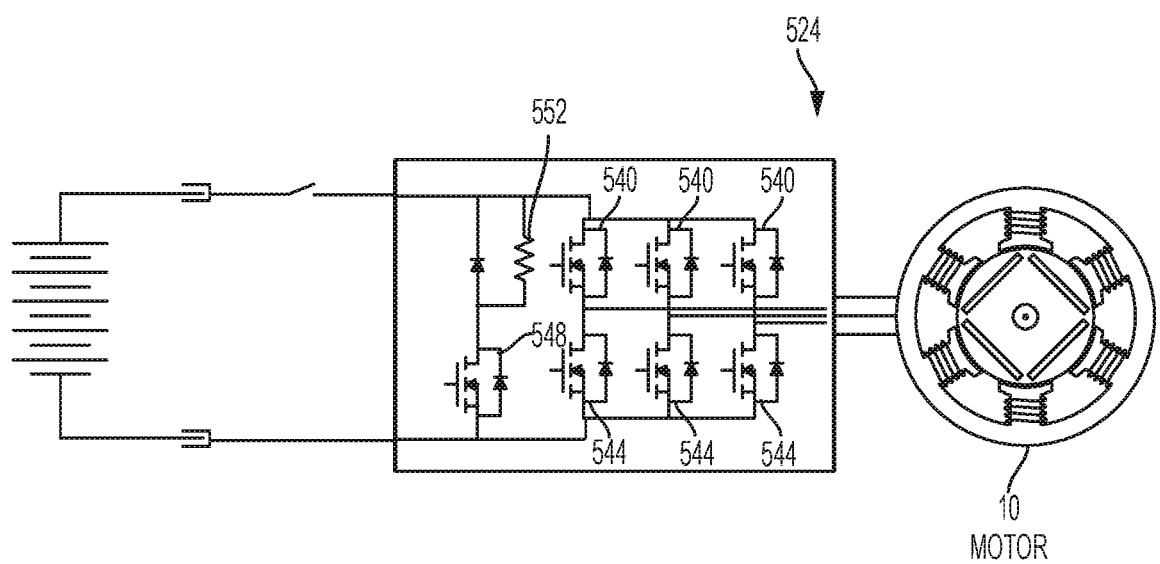
FIG. 29 is a block diagram of a motor drive circuit of the power tool of FIG. 27.

FIG. 29 illustrates a simplified block diagram of the motor drive circuit 524. The motor drive circuit 524 includes a plurality of high side power switching elements 540 (for example, Field Effect Transistors (FETs)), a plurality of low side power switching elements 544 (for example, FETs), a motor braking switch 548 (for example, motor braking FET 548), and a braking resistor 552 (also referred to as a braking coil 552). The motor controller 530 provides the control signals to control the high side FETs 540 and the low side FETs 544 to drive the motor 10 based on the motor feedback information and user controls, as noted above. For example, in response to detecting a pull of the trigger 512 and the input from forward/reverse selector 510, the motor controller 530 provides the control signals to selectively enable and disable the FETs 540 and 544 (e.g., sequentially, in pairs) resulting in power from the battery pack 501 to be selectively applied to stator coils of the motor 10 to cause rotation of the rotor 18.

More particularly, to drive the motor 10, the motor controller 530 enables a first high side FET 540 and first low side FET 544 pair (e.g., by providing a voltage at a gate terminal of the FETs) for a first period of time. In response to determining that the rotor 18 of the motor 10 has rotated based on a pulse from the Hall sensors 528, the motor controller 530 disables the first FET pair, and enables a second high side FET 540 and a second low side FET 544. In response to determining that the rotor of the motor 10 has rotated based on pulse(s) from the Hall sensors 528, the motor controller 530 disables the second FET pair, and enables a third high side FET 540 and a third low side FET 544. In response to determining that the rotor of the motor 10 has rotated based on further pulse(s) from the Hall sensors 528, the motor controller 530 disables the third FET pair and returns to enable the first high side FET 540 and the third low side FET 544. This sequence of cyclically enabling pairs of high side FET 540 and a low side FET 544 repeats to drive the motor 10. Further, in some embodiments, the control signals include pulse width modulated (PWM) signals having a duty cycle that is set in proportion to the amount of trigger pull of the trigger 512, to thereby control the speed or torque of the motor 10.

Figure 30:
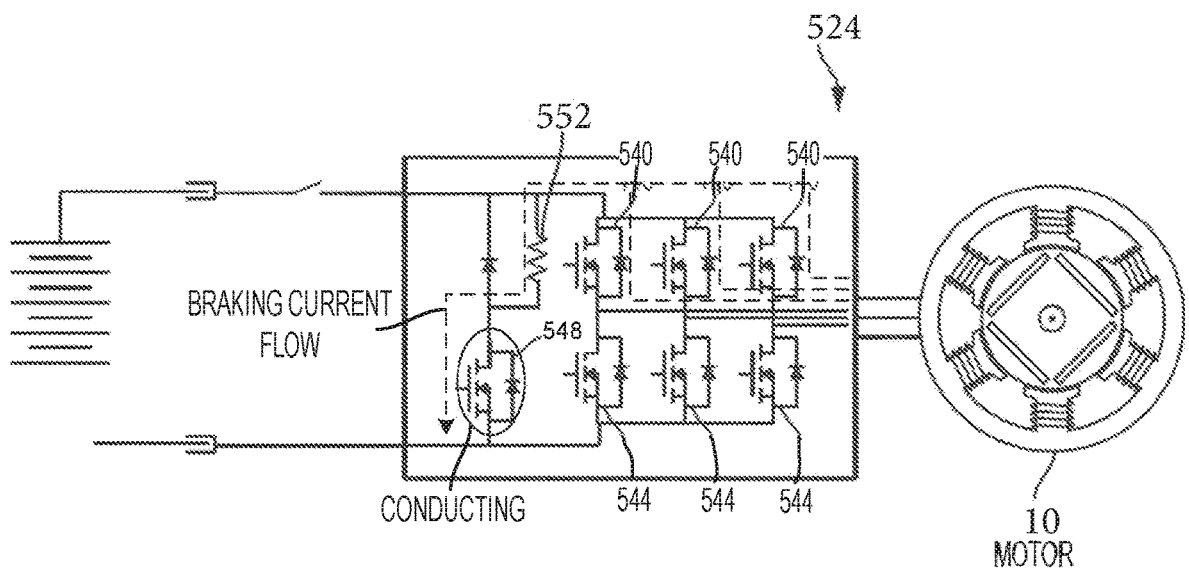
FIG. 30 is a block diagram of the motor drive circuit of FIG. 29 during braking of a motor of the power tool of FIG. 27.

To stop the motor 10, the motor controller 530 shorts the low side FETs 544 (i.e., enables the low side FETs 544 and disables the high side FETs 540) to allow the back EMF to flow through the motor coils of the motor 10. The back EMF provides a braking force on the magnets of the rotor 18. For power tools 500 in which it may be desirable to have a faster stopping of the motor 10 (e.g., saws, grinders, and the like), an additional resistance is used to brake the motor 10. As illustrated in FIG. 30, the motor controller 526 controls the braking FET 548 to close thereby connecting the braking resistor 552 to the current path of the motor 10. The braking resistance 552 absorbs the excess current and brings the motor 10 to a faster stop in comparison to a motor drive circuit 524 without the braking resistor 552. In the example illustrated, the high side FETs 540 are also closed to allow the back EMF to flow from the motor 10 through the high side FETs 540, the braking resistance 552 and to the ground or the negative terminal.

Figure 31:
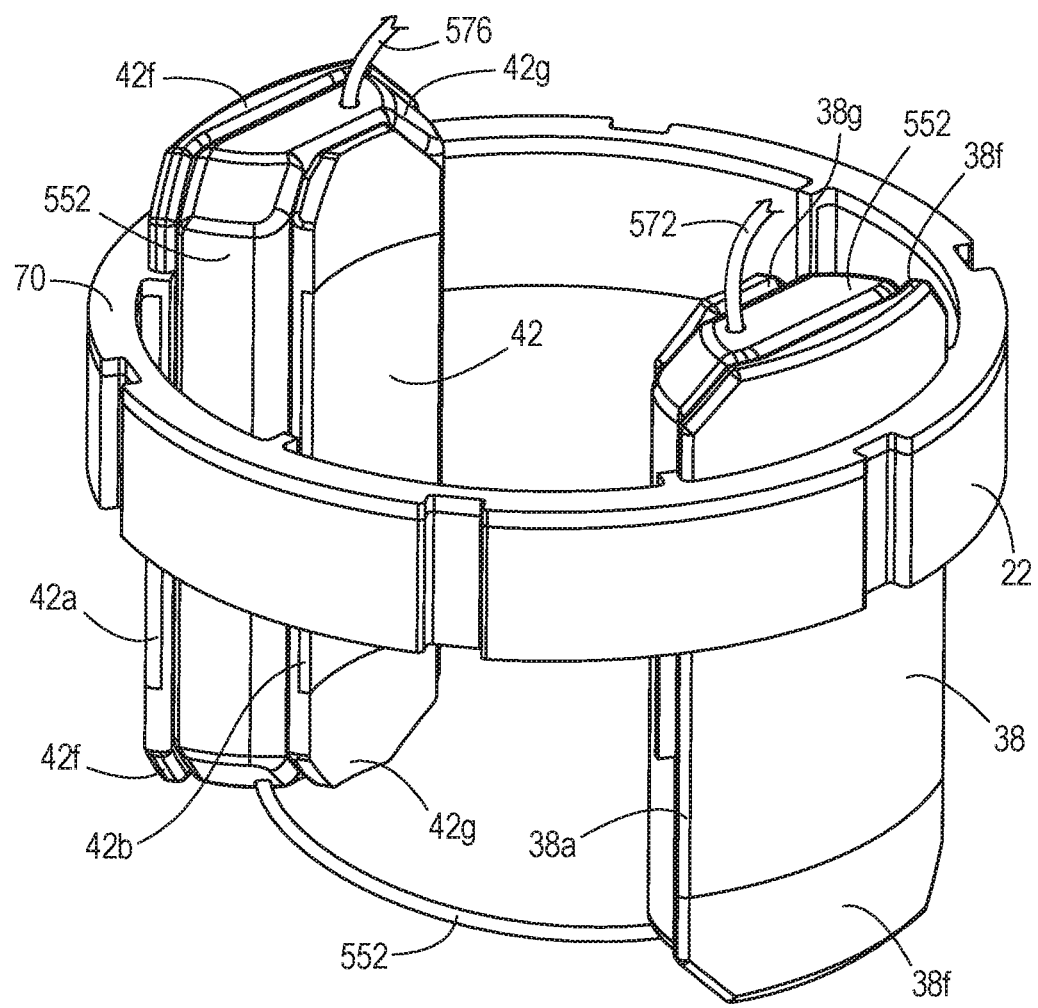
FIG. 31 is a perspective view of the first stator segment of FIG. 3 with insulation, first and second stator coils, and a motor braking coil added.

In some embodiments, during assembly of stator 14a, the motor braking coil 552 can be added. For example, FIG. 31 illustrates the motor braking resistance coil 552 being wound around the first and second stator coils 38h, 42h (not shown), after the first and second stator coils 38h, 42h have been wound around the insulated first and second teeth 38, 42 as shown in FIG. 9. A single coil is used as the motor braking coil 552 and is, for example, first wound around the stator coil 38h, then wound around the second stator coil 42h. Because the only other tooth on the first stator segment 22 is the second tooth 42, which is 180 degrees away from the first tooth 38, the first stator coil 38h and motor braking coil 552 are advantageously able to fill or substantially fill the slots 38d on the first tooth 38. In other words, because there are no teeth immediately adjacent the first tooth 38 of the first stator segment 22, during the winding process of the first stator coil 38h and motor braking coil 552, there is no other structure inhibiting the first stator coil 38h and motor braking coil 552 from being wound about the first tooth 38 until the motor braking coil 552 is flush with or even wound past the outer flange 38a in a circumferential direction. The first outer bookend 38f and the first inner bookend 38g radially secures the portions of the first stator coil 38h and motor braking coil 552 that respectively extend above and below the first tooth 38, such that the first stator coil 38h and motor braking coil 552 can be wound to a second total height H2 that is longer than the first height H1. Likewise, these principles apply to the winding of the motor braking coil 552 around the second tooth 42. Then, the rest of the stator 14a can be assembled as described above and shown in FIGS. 10-13, except that in this embodiment, the stator 14a includes the braking coil 552.

In some embodiments, the motor braking coil 552 may be wound such that ends 572 and 576 of the motor braking coil 552 are provided on the same side of the motor 10. For example, the first-sixth end wire portions 38i, 42i, 50i, 54i, 62i, 66i of the stator coils 38h, 42h, 50h, 54h, 62h, 66h are provided on one end of the motor 10 and the ends 572 and 576 of the motor braking coil 552b are provided on the opposite end of the motor 10. The ends 572 and 576 of the motor braking coil 552 are connected between the battery pack 501 and the braking FET 548 and are illustrated in FIG. 31.

Figure 32:
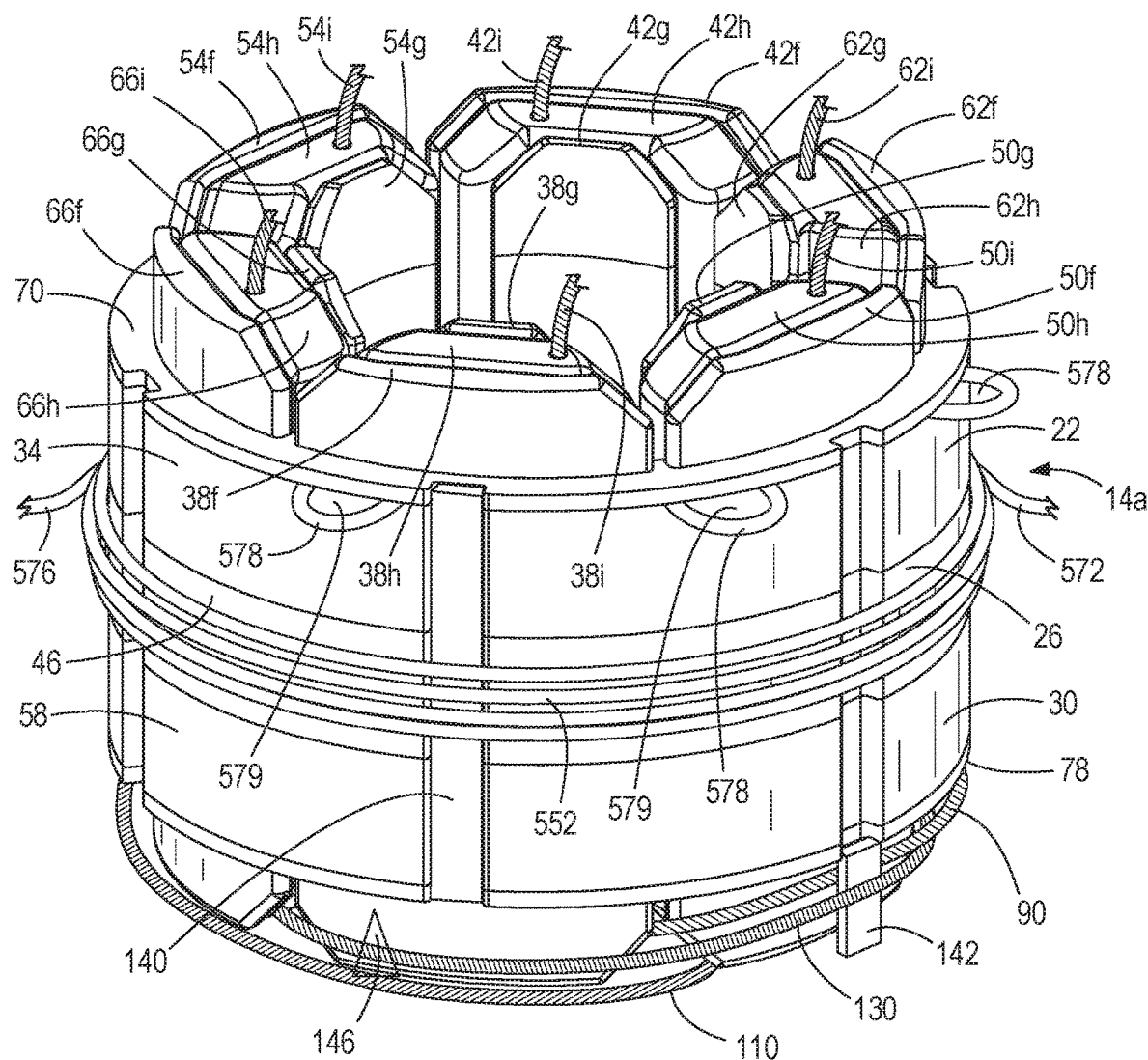
FIG. 32 is a perspective view of the stator of FIG. 2 with insulation, stator coils, and a motor braking coil added.
Figure 33:
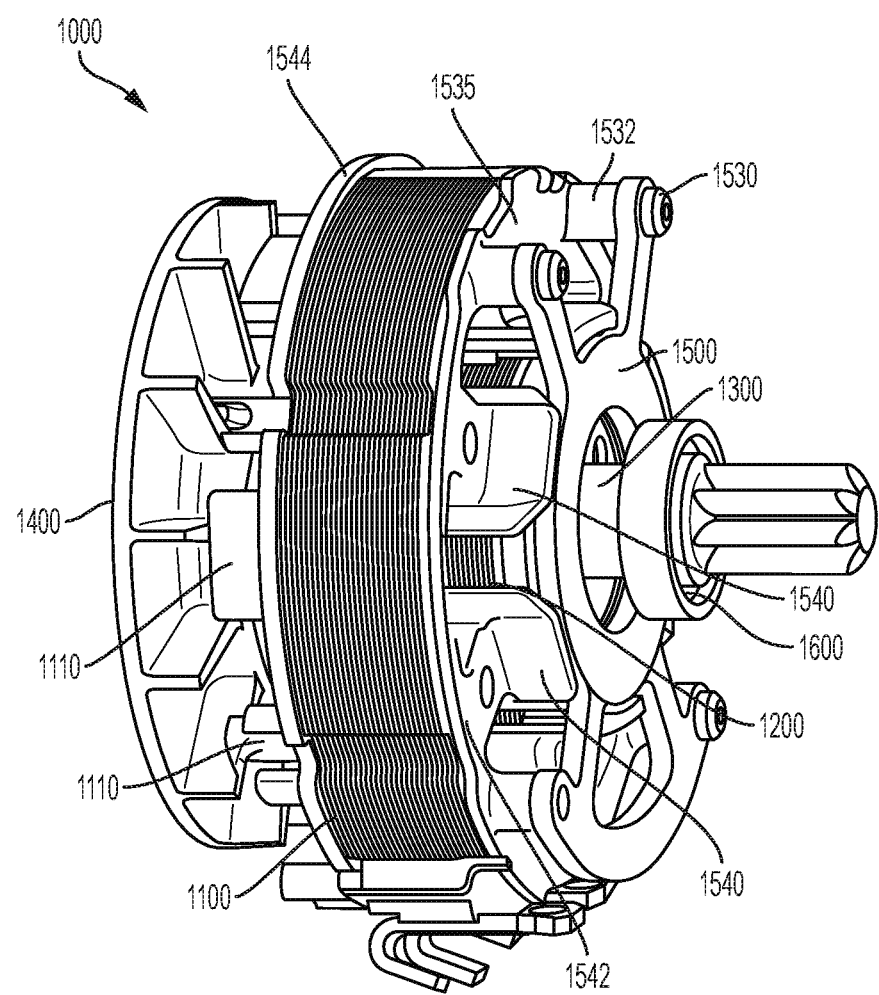
FIG. 33 is a perspective view of a motor incorporated in the power tool of FIG. 27 according to another embodiment of the invention.

In the embodiment illustrated in FIG. 32, the motor braking coil 552 is wound around the stator 14a of the motor 10. After the stator 14a has been assembled, the motor braking coil 552 is wound around the stator 14a between the first and second insulation end caps 70, 78. In the embodiment illustrated in FIG. 32, the motor braking coil 552 is wound around the second annular back portion 46. In other examples, the motor braking coil 552 may also be wound around another large object of the power tool 500. The motor braking coil 552 is, for example, a similar coil that is used for the stator coils 38h, 42h, 50h, 54h, 62h, 66h. A coil of appropriate length may be cut from the material used for stator coils 38h, 42h, 50h, 54h, 62h, 66h to use as the motor braking coil 552. The ends 572 and 576 of the motor braking coil 552 are connected between the power source 122 and the braking FET 548 and are illustrated in FIG. 32. The embodiment of FIG. 32 also illustrates a plurality of mounting ears, such as radially-outward extending bosses 578 on the first annular back portion 34, that can be used to secure the stator 14a within a power tool by, e.g. putting a fastener through the bosses 578. In some embodiments, the bosses 578 are injection molded onto the stator 14a.

Compared to an over the shelf resistor, the motor braking coil 552 distributes the braking resistance over a larger area. The motor braking coil 552 therefore generates less heat than an over the shelf resistor. The heat due to the current flowing in the motor braking coil 552 is generated over a larger surface area allowing for easier dissipation. Additionally, because the motor braking coil 552 is made from the same coil used for the stator coils 38h, 42h, 50h, 54h, 62h, 66h and no additional heat sink is required, the motor braking coil 552 results in reduced cost of the power tool 500.

Figure 36:
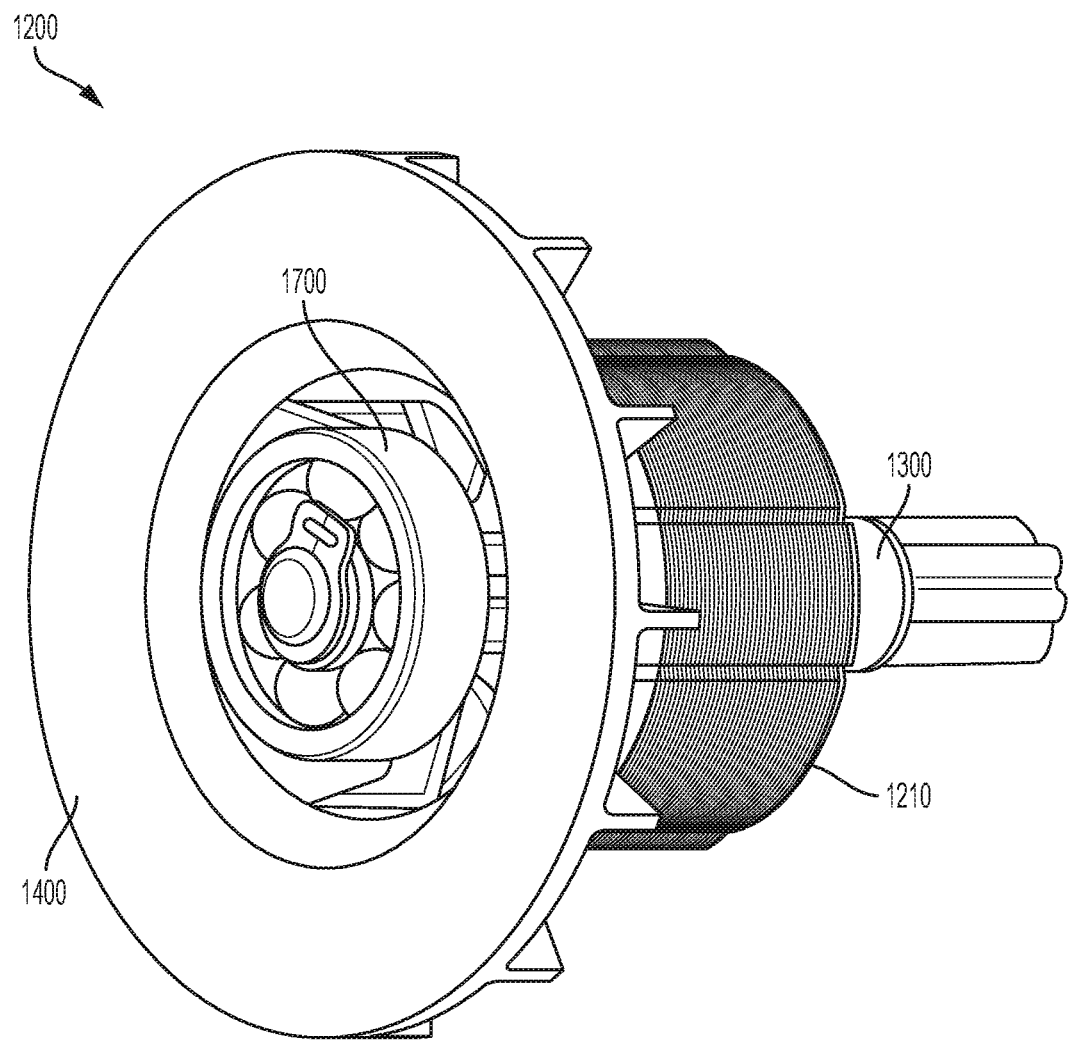
FIG. 36 is a rear perspective view of the rotor of FIG. 34.
Figure 37:
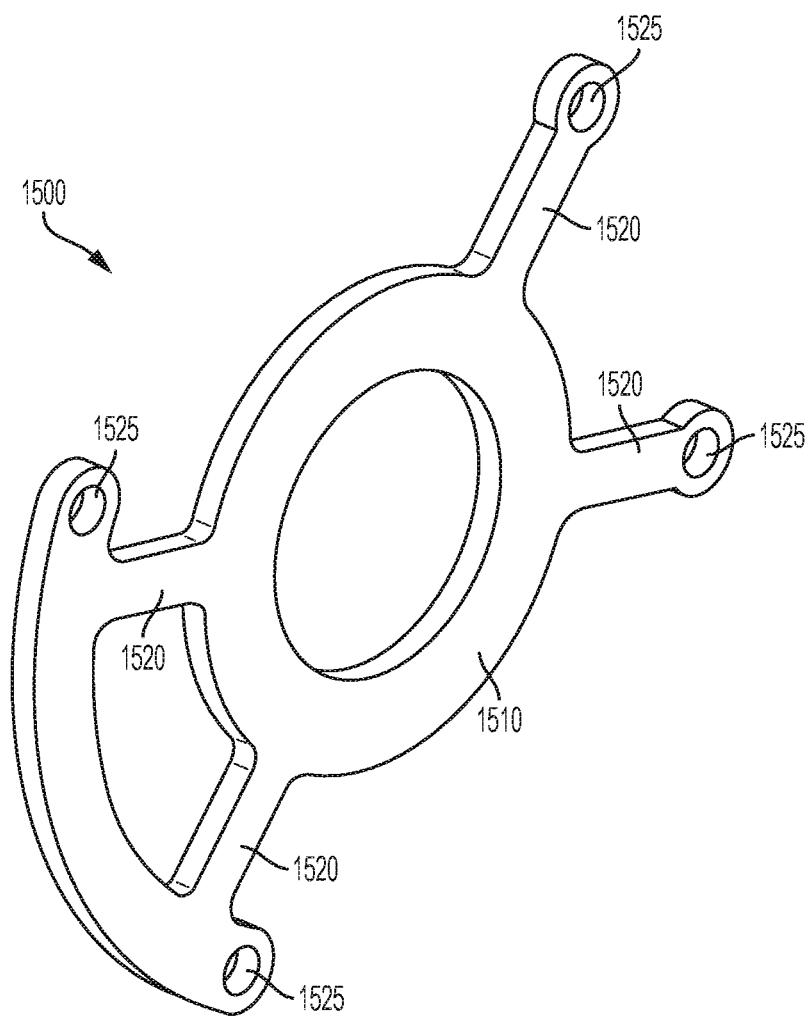
FIG. 37 is a perspective view of a position sensor board assembly of the motor of FIG. 33.
Figure 38:
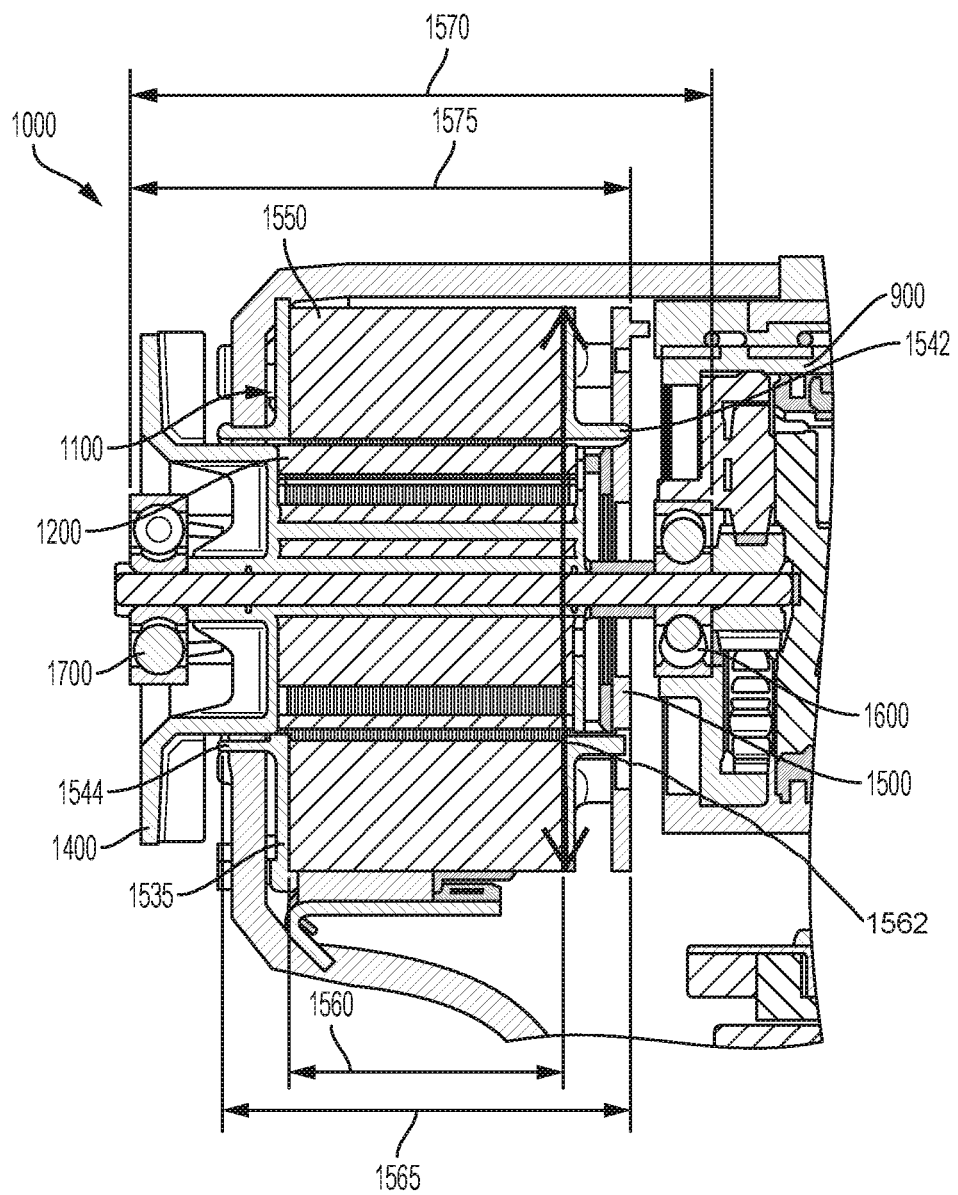
FIG. 38 is a cross section of the motor of FIG. 33.

FIGS. 33-38 illustrate a motor 1000 according to some embodiments of the invention. Like the motor 10, the motor 1000 may be incorporated into the tool 500 of FIG. 28 and is an example of the motor 10 in the block diagram of FIG. 28. Additionally, like the motor 10, the motor 1000 may also be incorporated into other types of power tools, as described above. The motor 1000 includes the stator 1100, a rotor 1200 that drives a shaft 1300, a fan 1400, and a position sensor board assembly 1500. The stator coils are not shown in FIG. 33, but are described in greater detail below. The stator 1100 also includes a stator frame 1535 including a front stator end cap 1542 and a rear stator end cap 1544. The front stator end cap 1542 and the rear stator end cap 1544 may be integrally formed as a single piece (i.e., the stator frame 1535) or, alternatively, may be two separate pieces that together form the stator frame 1535. The stator frame 1535 may be formed by an injection molding process, for example, by injecting a resin material into a mold including a stator lamination stack 1550 (FIG. 38). Accordingly, the stator frame 1535 may be a monolithic structure formed of hardened resin.

The position sensor board assembly 1500 is provided on a front side of the motor 1000 and the fan 1400 is provided on a rear side of the motor 1000. In some embodiments, the stator coils of motor 1000 may be routed on the rear side of the stator 1100. For example, the stator coils may be routed with the help of the tabs 1110 positioned on the rear stator end cap 1544 of the stator 1100. In some embodiments, the stator 1100 could be assembled and the stator coils wound around the teeth of stator 1100 in the same manner as stator 14a or stator 14b. In some embodiments, the stator coils could be wound around the teeth of the stator 1100 in the same manner as described with stator 284. In some embodiments, the stator coils could be wound around the teeth of stator 1100 in the same manner as described with stator coil 332, using either the method schematically shown in FIG. 25 or FIG. 26.

Figure 34:
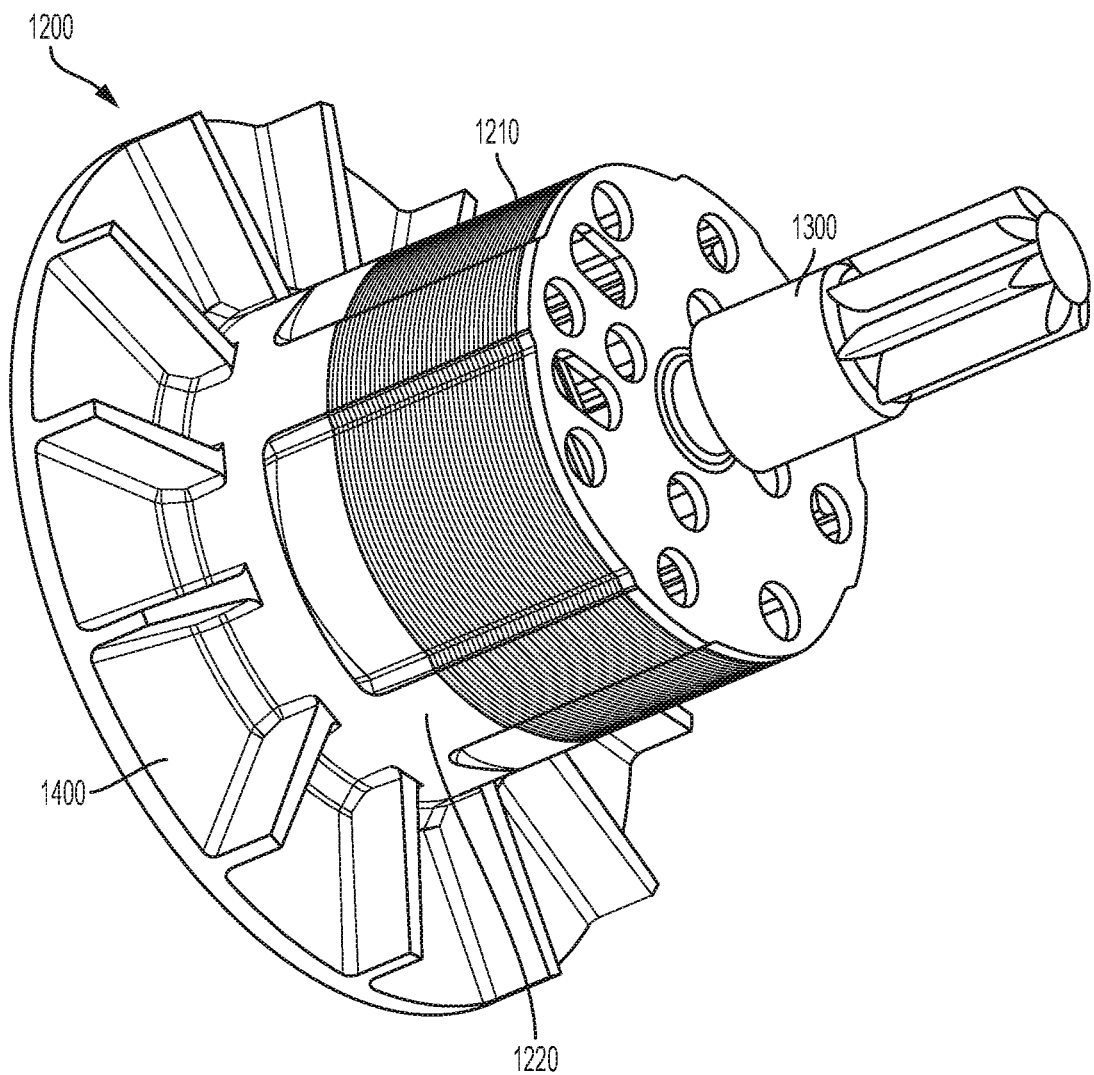
FIG. 34 is a perspective view of a rotor of the motor of FIG. 33.
Figure 35:
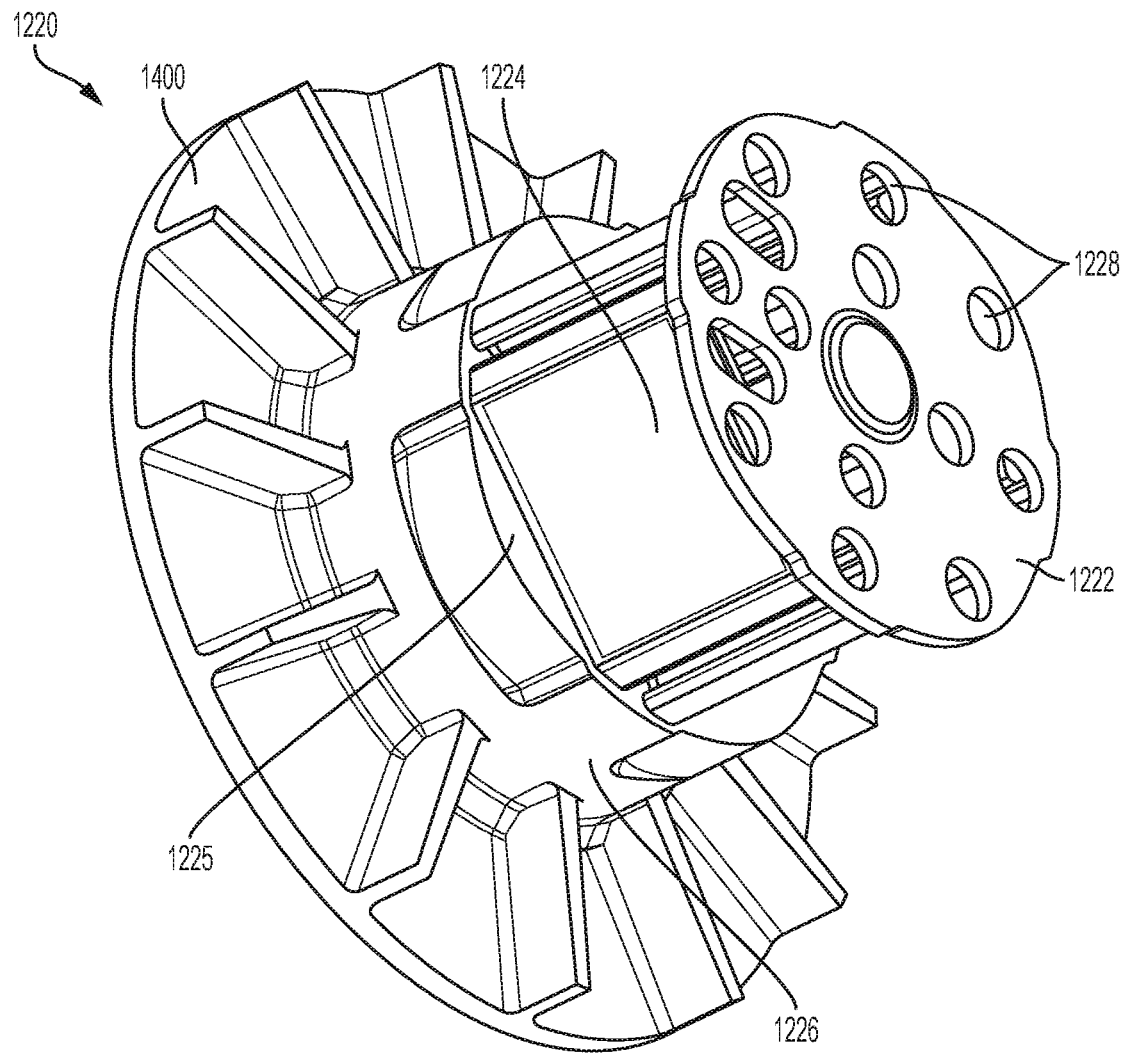
FIG. 35 is a perspective view of a rotor end cap of the rotor of FIG. 34.

FIG. 34 is a perspective view of the rotor 1200 and the fan 1400. The rotor 1200 includes a rotor core 1210 and a rotor frame 1220. The rotor core 1210 is made of rotor laminations, which form a rotor stack, and that define a central aperture (FIG. 38) to receive the shaft 1300 and magnet receiving apertures to receive rotor magnets (FIG. 38). FIG. 35 is a perspective view of the rotor frame 1220 and the fan 1400. The rotor frame 1220 includes a first face portion 1222 (also referred to as a face plate) provided on a front side of the rotor 1200, a magnet housing portion 1224, and an end portion 1226 provided on a rear side of the rotor 1200 opposite the front side. The end portion 1226 includes a second face portion 1225 and the fan 1400. The first face portion 1222 and the second face portion 1225 house the rotor core 1210 having the rotor laminations. That is, the first face portion 1222 and the second face portion 1225 enclose the rotor lamination stack (i.e., the rotor core 1210) between them. The first face portion 1222 and the second face portion 1225 also retain the rotor magnets in the magnet receiving apertures of the rotor core 1210. The rotor 1200, in contrast to the rotors 202 and 320 above, does not include a separate rotor enclosure with additional end caps. Accordingly, the first face portion 1222 and the second face portion 1225 may be referred to as rotor end caps of the rotor 1200. In contrast to the fixed (non-rotating) configuration of the rotor end caps in the rotors 202 and 320, the first face portion 1220 and the second face portion 1225 rotate with the rotor core 1210. The magnet housing portion 1224 houses the permanent magnets inserted into the rotor core 1210. The magnet housing portion 1224 also extends through the magnet apertures of the rotor core 1210, as shown in FIG. 38.

As can be seen from FIGS. 34 and 35, the rotor frame 1220 is integrally formed with the fan 1400. The rotor frame 1220 and the fan 1400 may be integrally formed during an injection molding process. During the injection molding process, the rotor core 1210 and the rotor magnets may be placed in a die while a plastic or resin material is injected into the die to form the rotor frame 1220 and the fan 1400. Accordingly, the rotor frame 1220 may be a monolithic structure formed of hardened resin. In some embodiments, for example, rather than injection molding to integrally form the fan 1400 with the rotor frame 1220, the fan 1400 may be press-fit onto the rotor frame 1220.

In some embodiments, the first face portion 1222 may include apertures 1228. The apertures may be provided to balance the motor 1000. The number and placement of the apertures 1228 may be determined during the injection molding process based on the weight and size imbalances of the rotor 1200. In some embodiments, other motor balancing techniques may also be used. In one example, the mold may be modified or calibrated such that certain portions of the fan 1400 or the rotor frame 1220 may be removed to balance the motor 1000. For a particular die, a sample rotor 1200 may be formed using injection molding as described. The sample rotor 1200 may be tested to detect imbalances. Based on the imbalances, projections or posts may be placed in the die to occupy space in the die and prevent injected resin material from forming in that location, resulting in the apertures 1228. In another example, the apertures 1228 may be formed by scraping away or otherwise removing material from the resin-formed portions of the rotor 1200 after the injection molding process. In some embodiments, the plastic or resin material may be injected into the magnet receiving apertures such that the plastic or resin material pushes the rotor magnets frontward and outward within the magnet receiving apertures for even distribution, reducing imbalances.

Returning to FIG. 33, the motor 1000 also includes a front bearing 1600 that rotatably couples the shaft 1300 to the gear case 900. As such, the front bearing 1600 fixes the motor 1000 to the gear case 900. Referring to FIG. 36, the motor 1000 also includes a rear bearing 1700 provided in a rear opening of the fan 1400. The outer race of the rear bearing 1700 may be positioned within a recess located at the rear of the power tool housing 102 to secure the motor 1000 within the power tool 500.

FIG. 37 illustrates the position sensor board assembly 1500. The position sensor board assembly 1500 includes an annular portion 1510 (also referred to as an annular board portion) with legs 1520 extending radially outward from the annular portion 1510. The position sensor board assembly 1500 includes the Hall sensors 528 (or other position sensors) (FIG. 28) to detect one or more of the rotational position, velocity, and acceleration of the motor 1000. Returning to FIG. 33, fasteners 1530 extend through holes 1525 in the legs 1520 into fastener mounts 1532 (FIG. 33) of a stator frame 1535 of the stator 1100 to fix the position sensor board assembly 1500 to the stator 1100. The legs 1520 are circumferentially positioned on the annular portion 1510 to align with gaps between adjacent stator end cap teeth 1540 such that the legs 1520 extend through the gaps between adjacent stator end cap teeth 1540. This alignment, and the annular portion 1510 having a diameter that is less than inner diameter of the stator frame 1535, enables the position sensor board assembly 1500 to be positioned closer to the rotor 1200 and within a stator envelope 1565 (FIG. 38). This positioning enables the Hall sensors 128 to be closer to the rotor magnets and reduces the axial length of the motor 1000.

FIG. 38 is a cross-sectional view of the motor 1000. In the illustrated embodiment, the stator 1100 includes a stator lamination stack 1550 having a predetermined number of stator laminations 710. The stator laminations 710 together define a stack length 1560 in the axial direction extending between axial ends of the stator lamination stack 1550. FIG. 38 also illustrates an outer diameter 1562 of the stator lamination stack 1550. In the embodiment illustrated in FIGS. 33-38, the outer diameter 1562 is 50 mm, but in other embodiments, the outer diameter 1562 could be greater or smaller.

FIG. 38 also illustrates the stator envelope 1565 of the motor 1000, which extends between the axial ends of the stator frame 1535 (i.e., between the axial end faces of the front stator end cap 1542 and the rear stator end cap 1544). In some embodiments, the position sensor board assembly 1500, the first face portion 1222, and the second face portion 1225 are within the stator envelope 1565, while the end portion 1226 is partially within and partially outside the stator envelope 1565. The front bearing 1600 and the rear bearing 1700 may be located outside the stator envelope 1565.

In addition, the front bearing 1600 and the rear bearing 1700 define a bearing-to-bearing length 1570 in the axial direction between the axial ends of the front bearing 1600 and the rear bearing 1700. Further, the position sensor board assembly 1500 and the rear bearing 1700 define a bearing-to-board length 1575 in the axial direction between the axial ends of the position sensor board assembly 1500 and the rear bearing 1700. A bearing-to-board length, such as the bearing-to-board length 1575, describes the distance between a bearing and position sensor board assembly that are located on axially opposite sides of a motor. In some embodiments, the stator 1100 (including the stator frame 1535), the rotor 1200, the rotor frame 1220, the fan 1400, the position sensor board assembly 1500, the front bearing 1600, and the rear bearing 1700 may be located entirely within the bearing-to-bearing length 1570. In some embodiments, the stator 1100 (including the stator frame 1535), the rotor 1200, the rotor frame 1220, the fan 1400, the position sensor board assembly 1500, and the rear bearing 1700 may be entirely within the bearing-to-board length 1575, while the front bearing 1600 may be (either partially or entirely) outside the bearing-to-board length 1575.

In some embodiments, the bearing-to-bearing length 1570 is 51.5 millimeters and the bearing-to-board length 1575 is 44.5 millimeters. However, these lengths vary based on the stack length 1560. The stack length 1560 may vary for each motor 1000 based on the desired motor characteristics. For example, the stack length 1560 may vary between about 10 millimeters and 45 millimeters based on the output requirements of the motor 1000. In some embodiments, a difference between the bearing-to-bearing length 1570 and the stack length 1560 is 27.5 millimeters or less than 27.5 millimeters. In some embodiments, the difference between the bearing-to-bearing length 1570 and the stack length 1560 is less than 26.5 millimeters, less than 28.5 millimeters, less than 29.5 millimeters, less than 30.5 millimeters, between 25.5 millimeters and 30.5 millimeters, between 25.5 millimeters and 27.5 millimeters, between 27.5 millimeters and 30.5 millimeters, between 26.5 millimeters and 28.5 millimeters, or another range between 25.5 millimeters and 30.5 millimeters. This difference may be adjusted in the range, for example, by reducing the axial thickness of one or both of the bearings 1600, 1700 or of the end portion 1226. In the context of a measurement range herein, such as, "between 25.5 millimeters and 28.5 millimeters," the term "between" is intended to include values that are greater than or equal to the lower endpoint and that are less than or equal to the upper endpoint. Accordingly, as an example, 25.5 millimeters is considered to be between 25.5 millimeters and 28.5 millimeters. In some embodiments, a difference between the bearing-to-board length 1575 and the stack length 1560 is 20.5 millimeters or less than 20.5 millimeters. In some embodiments, a difference between the bearing-to-board length 1575 and the stack length 1560 is less than 19.5 millimeters, less than 21.5 millimeters, less than 22.5 millimeters, less than 23.5 millimeters, between 18.5 millimeters and 23.5 millimeters, between 20.5 millimeters and 23.5 millimeters, between 19.5 millimeters and 21.5 millimeters, or another range between 18.5 millimeters and 23.5 millimeters. This difference may be adjusted in the range, for example, by reducing the axial thickness of the bearing 1700 or of the end portion 1226.

In some embodiments, the bearing-to-bearing length 1570 may be in a range of 30 millimeters to 60 millimeters, depending on the stack length 1560, an axial fan length of the fan 1400, and a board thickness (in the axial direction) of the position sensor board assembly 1500. Here, a difference between the bearing-to-bearing length 1570 and a sum of the stack length 1560, the axial fan length of the fan 1400, and the board thickness of the position sensor board assembly 1500 is 15 millimeters or less than 15 millimeters. In some embodiments, this difference is less than 14 millimeters, less than 16 millimeters, less than 17 millimeters, less than 18 millimeters, less than 19 millimeters, less than 20 millimeters, between 13 millimeters and 15 millimeters, between 15 millimeters and 20 millimeters, between 14 millimeters and 16 millimeters, between 13 millimeters and 18 millimeters, or another range between 13 millimeters and 20 millimeters. This difference may be adjusted in the range, for example, by reducing the axial thickness of one or both of the bearings 1600, 1700. Thus, the configuration of the embodiments provides an axially compact motor design.

Figure 39:
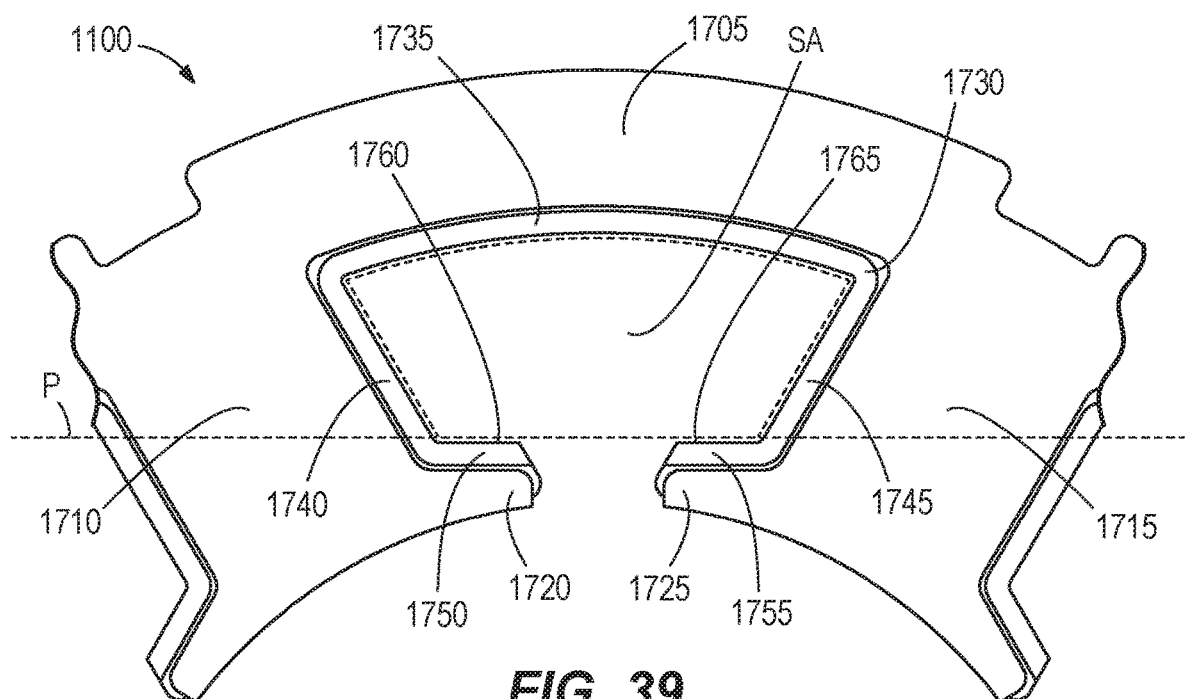
FIG. 39 is an enlarged cross-sectional view of a stator of the motor of FIG. 33, with the stator coils removed.

As shown in FIG. 39, the stator 1100 includes a back stator portion 1705. A plurality of teeth are arranged around the inner circumference of the back stator portion 1705 and extend radially inward from the back stator portion 1705. As with stators 14a and 14b, in some embodiments, the stator 1100 includes a total of six radially-inward extending teeth. For purposes of illustration, only two of the plurality of teeth, a first tooth 1710 and an adjacent second tooth 1715, are shown in FIG. 39. The first tooth 1710 includes a first flange 1720 extending away from the first tooth 1710 and the second tooth 1715 includes a second flange 1725 extending away from the second tooth 1715 and toward the first flange 1720.

As with stators 14a and 14b, insulation 1730 covers portions of the first and second teeth 1710, 1715, as well as the back stator portion 1705. Specifically, the insulation 1730 includes a back insulation portion 1735 covering the back stator portion 1705, a first tooth portion 1740 covering the first tooth 1710, a second tooth portion 1745 covering the second tooth 1715, a first flange portion 1750 covering the first flange 1720, and a second flange portion 1755 covering the second flange 1725. The first flange portion 1750 has a first face 1760 that is in facing relationship with the back insulation portion 1735 and the second flange portion 1755 has a second face 1765 that is in facing relationship with the back insulation portion 1735. The first face 1760 and the second face 1765 together substantially define a boundary plane P, such that a cross-sectional slot area SA is defined between the back insulation portion 1735, the first tooth portion 1740, the second tooth portion 1745, and the boundary plane P.

Figure 40:
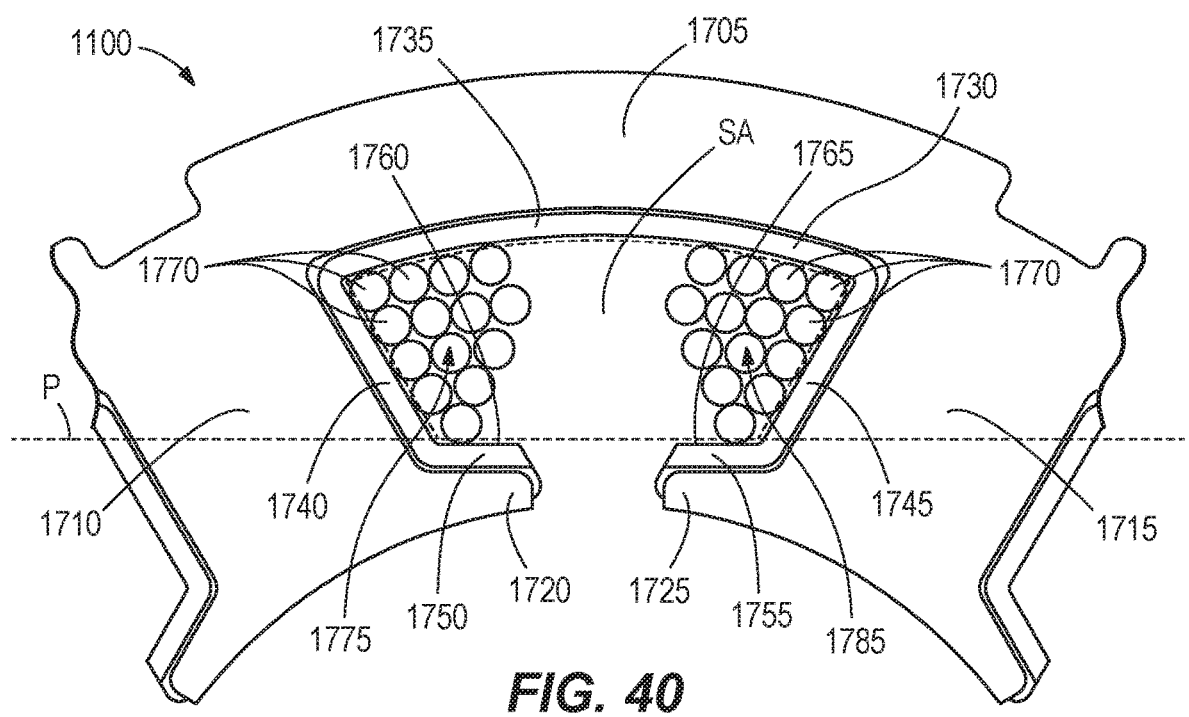
FIG. 40 is an enlarged cross-sectional view of a stator of the motor of FIG. 33, with the stator coils included.

As shown in FIG. 40, during assembly of the stator 1100, a first plurality of conductive (e.g. copper) wires 1770, making up a first stator coil 1775, are wrapped around the first tooth 1710 and thus arranged between the first and second teeth 1710, 1715 within the cross-sectional slot area SA. Similarly, during assembly of the stator 1100, a second plurality of conductive (e.g. copper) wires 1780, making up a second stator coil 1785, are wrapped around the second tooth 1715 and thus arranged between the first and second teeth 1710, 1715 within the cross-sectional slot area SA. As described above, in some embodiments, the stator 1100 could be assembled and the stator coils wound around the teeth of stator 1100 in the same manner as stator 14a or stator 14b. In some embodiments, the stator coils could be wound around the teeth of the stator 1100 in the same manner as described with stator 284. In some embodiments, the stator coils could be wound around the teeth of stator 1100 in the same manner as described with stator coil 332, using either the method schematically shown in FIG. 25 or FIG. 26.

The sum of the cross-sectional areas of each of the individual copper wires 1770, 1780 within the cross-sectional slot area SA collectively define a total cross-sectional winding area WA, such that a slot-fill ratio (WA/SA) of cross-sectional winding area WA to cross-sectional slot area SA is defined. In some embodiments, the slot-fill ratio is 0.30 or greater. In some embodiments, the slot-fill ratio is 0.37 or greater. In some embodiments, the slot-fill ratio is 0.45 or greater. In some embodiments, the slot-fill ratio is 0.57 or greater. While FIG. 40 only shows the wires 1770, 1775 arranged between the first and second teeth 1710, 1715, wires of different stator coils would also arranged between each and every adjacent pair of teeth on the stator 1100, such that the slot-fill ratio would be substantially similar or identical between every pair of adjacent teeth on the stator 1100.

The below four tables illustrate results from tests to determine performance characteristics of the motor 1000 and power tool 500 when implementing slot-fill ratios of 0.30, 0.37, 0.45 and 0.57 at different amperage levels 40 A, 60 A, 80 A, 100 A drawn by the motor 1000. A single test was run for each combination of amperages and slot-fill ratios. In each of these tests, the stator lamination stack 1550 has a stack length 1560 of 24 mm and an outer diameter 1562 of 50 mm. Also, in each of these tests, the battery pack 501 used with power tool 500 was a nominal 18V, 6 Amp-hour battery pack.

Each table lists the slot-fill ratio for the slots between each pair of adjacent teeth in the stator 1100. Each table also lists the time in continuous seconds of run time that it took for one of the motor drive circuit 524 or the stator coils of the motor 1000, to reach a critical temperature at which the motor controller 530 would shut down the motor 1000 to prevent damage thereto. Each table also lists the power output of the power tool 500 in Watts, the airflow through the power tool 500 in cubic feet per minute (CFM), and power out in Watts per CFM, which measures the rate at which the power tool 500 can perform work per rate of airflow to keep the power tool 500 cool.

Table 1 illustrates when the motor 1000 is drawing 40 A of current, and compares performance characteristics when the stator 1100 of the motor 1000 has a slot-fill ratio of 0.30, 0.37, 0.45 and 0.57 between each pair of adjacent teeth.

TABLE 1

| Motor 1000 drawing 40 A of current | | | | |
| --- | --- | --- | --- | --- |
| Slot-Fill Ratio | 0.30 | 0.37 | 0.45 | 0.57 |
| Time to Critical Temp (Seconds) | 536 | 484 | 424 | 511 |
| Power Out (Watts) | 541 | 525 | 550 | 537 |
| Airflow through tool 500 (CFM) | 4.9 | 4.4 | 4 | 3.8 |
| Power Out/CFM (Watts/CFM) | 110.4 | 119.3 | 137.5 | 141.3 |

Table 2 illustrates when the motor 1000 is drawing 60 A of current, and compares performance characteristics when the stator 1100 of the motor 1000 has a slot-fill ratio of 0.30, 0.37, 0.45 and 0.57 between each pair of adjacent teeth.

TABLE 2

| Motor 1000 drawing 60 A of current | | | | |
| --- | --- | --- | --- | --- |
| Slot-Fill Ratio | 0.30 | 0.37 | 0.45 | 0.57 |
| Time to Critical Temp (Seconds) | 27 | 79 | 76 | 91 |
| Power Out (Watts) | 728 | 722 | 755 | 755 |
| Airflow through tool 500 (CFM) | 4.2 | 3.9 | 3.3 | 3.1 |
| Power Out/CFM (Watts/CFM) | 173.33 | 185.13 | 228.79 | 243.55 |

Table 3 illustrates when the motor 1000 is drawing 80 A of current, and compares performance characteristics when the stator 1100 of the motor 1000 has a slot-fill ratio of 0.30, 0.37, 0.45 and 0.57 between each pair of adjacent teeth.

TABLE 3

| Motor 1000 drawing 80 A of current | | | | |
| --- | --- | --- | --- | --- |
| Slot-Fill Ratio | 0.30 | 0.37 | 0.45 | 0.57 |
| Time to Critical Temp (Seconds) | 15 | 27 | 37 | 43 |
| Power Out (Watts) | 827 | 832 | 874 | 900 |
| Airflow through tool 500 (CFM) | 3.5 | 3.1 | 2.9 | 2.6 |
| Power Out/CFM (Watts/CFM) | 236.3 | 268.4 | 301.4 | 346.2 |

Table 4 illustrates when the motor 1000 is drawing 100 A of current, and compares performance characteristics when the stator 1100 of the motor 1000 has a slot-fill ratio of 0.30, 0.37, 0.45 and 0.57 between each pair of adjacent teeth.

TABLE 4

| Motor 1000 drawing 100 A of current | | | | |
| --- | --- | --- | --- | --- |
| Slot-Fill Ratio | 0.30 | 0.37 | 0.45 | 0.57 |
| Time to Critical Temp (Seconds) | 8 | 15 | 19 | 26 |
| Power Out (Watts) | 847 | 871 | 907 | 970 |
| Airflow through tool 500 (CFM) | 3.0 | 2.7 | 2.5 | 2.0 |
| Power Out/CFM (Watts/CFM) | 282.3 | 322.6 | 362.8 | 485.0 |

Figure 41:
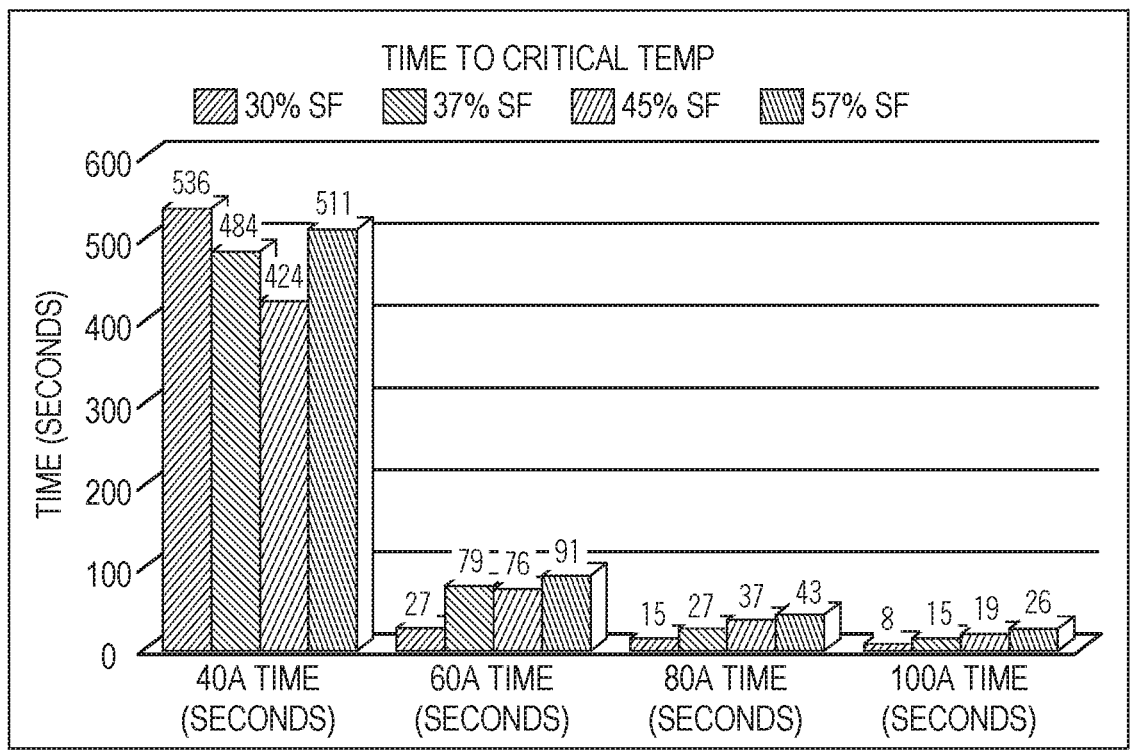
FIG. 41 is a bar graph showing a relationship between amperage used by the motor of FIG. 33, slot-fill ratio of the motor, and time for the motor to reach a critical temperature.

FIG. 41 provides a bar graph representation of the time to reach the critical temperature, with variations of the stator 1100 having a 0.30, 0.37, 0.45, and 0.57 slot-fill ratio respectively at 40 A, 60 A, 80 A and 100 A loads. For loads of 60 A, 80 A, and 100 A, implementing a 0.57 slot-fill ratio results in a higher time to reach the critical temperature than when implementing a 0.30, 0.37, or 0.45 slot-fill ratio. This is because the increased amount of copper filling the slot between the first and second teeth 1710, 1715 improves the heatsinking ability of the stator coils. Thus, with a 0.57 slot-fill ratio, more thermal energy from the motor drive circuit 524 and the motor 1000 itself can be absorbed by the copper than with 0.30, 0.37, and 0.45 slot-fill ratios, resulting in the motor 1000 and motor drive circuit 524 taking a longer time to reach their respective critical temperature. Indeed, in some tests, it was also shown the battery pack 501 ran at a cooler temperature when utilizing the a 0.57 slot-fill ratio than when utilizing the 0.30, 0.37, and 0.45 slot-fill ratios, indicating that the additional copper filling the slots between the stator teeth was also absorbing heat from the battery pack 501.

In the aforementioned tests, the motor drive circuit 524 was arranged remote from the motor 1000. However, in embodiments where the motor drive circuit 524 is arranged proximate or on the motor 1000, the increase in time to critical temp could be even greater, as the coils would have an increased ability to absorb thermal energy from the motor drive circuit 524 due to their increased proximity. Further, in embodiments in which the motor 1000 is arranged in totally enclosed system, in which air outside an enclosure for the motor 1000 is not permitted to flow through the motor 1000, using a higher slot-fill ratio to heatsink the motor drive circuit 524 could increase the time to critical temperature even greater than when motor 1000 is used in an open system. Since only one test was run for each of the slot-fill ratios at 40 A, and because the time to reach critical temperature was much higher at 40 A than at 60 A, 80 A or 100 A, it is likely that variance can explain the relational difference between the slot-fill ratio and time to reach critical temperature at 40 A.

The longer time to reach the critical temperature due to utilizing a higher slot-fill ratio is especially advantageous at higher loads such as 60 A, 80 A and 100 A, because the increased time duration over which the power tool 500 can operate can mean the difference between an operator completing a difficult, high load operation or the motor 1000 (such as finishing a difficult fastener) and the motor drive circuit 524 hitting the critical temperature and shutting down, thus requiring the operator to wait for the power tool 500 to cool down before continuing the operation.

Figure 42:
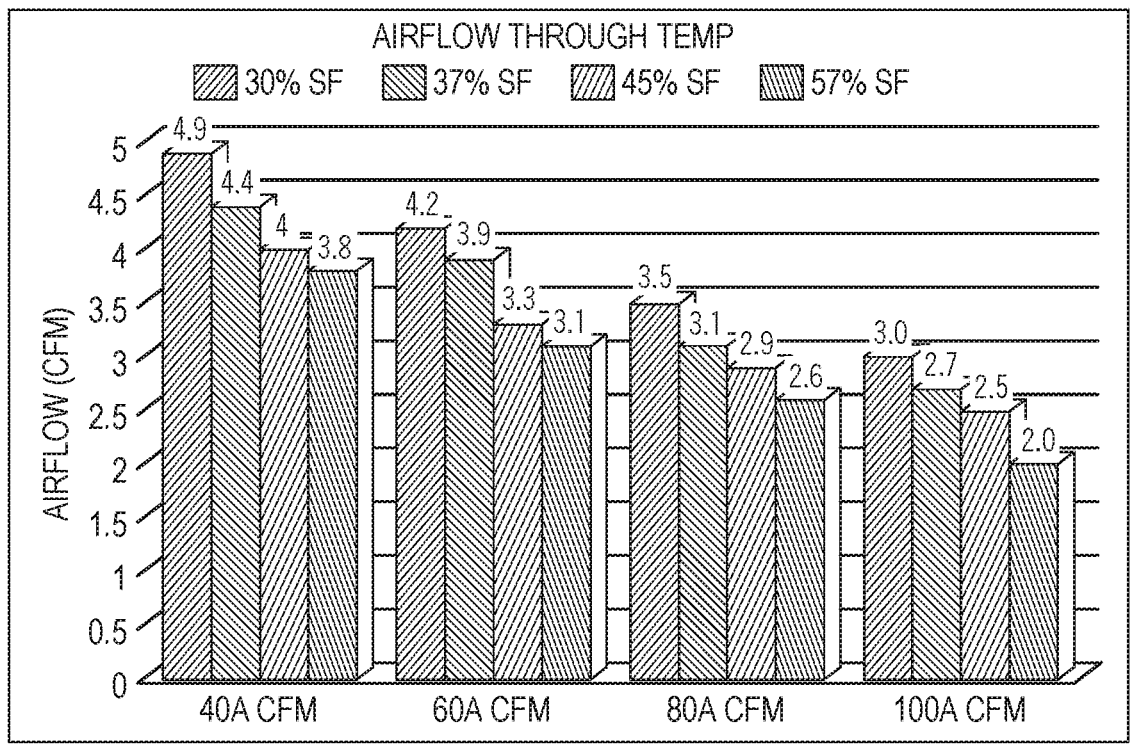
FIG. 42 is a bar graph showing a relationship between amperage used by the motor of FIG. 33, slot-fill ratio of the motor, and airflow through the power tool of FIG. 27.

FIG. 42 provides a bar graph representation of the airflow through the power tool 500, with the variations of the stator 1100 using a 0.30, 0.37, 0.45, and 0.57 slot-fill ratio respectively at 40 A, 60 A, 80 A and 100 A. As shown in FIG. 42, the airflow through the power tool 500 decreases as the slot-fill ratio increases, which is a logical result of there being more copper filling each slot between adjacent teeth on the stator 1100. Specifically, with more copper filling each slot, there is less room for air to flow therethough, resulting in a lower CFM.

Figure 43:
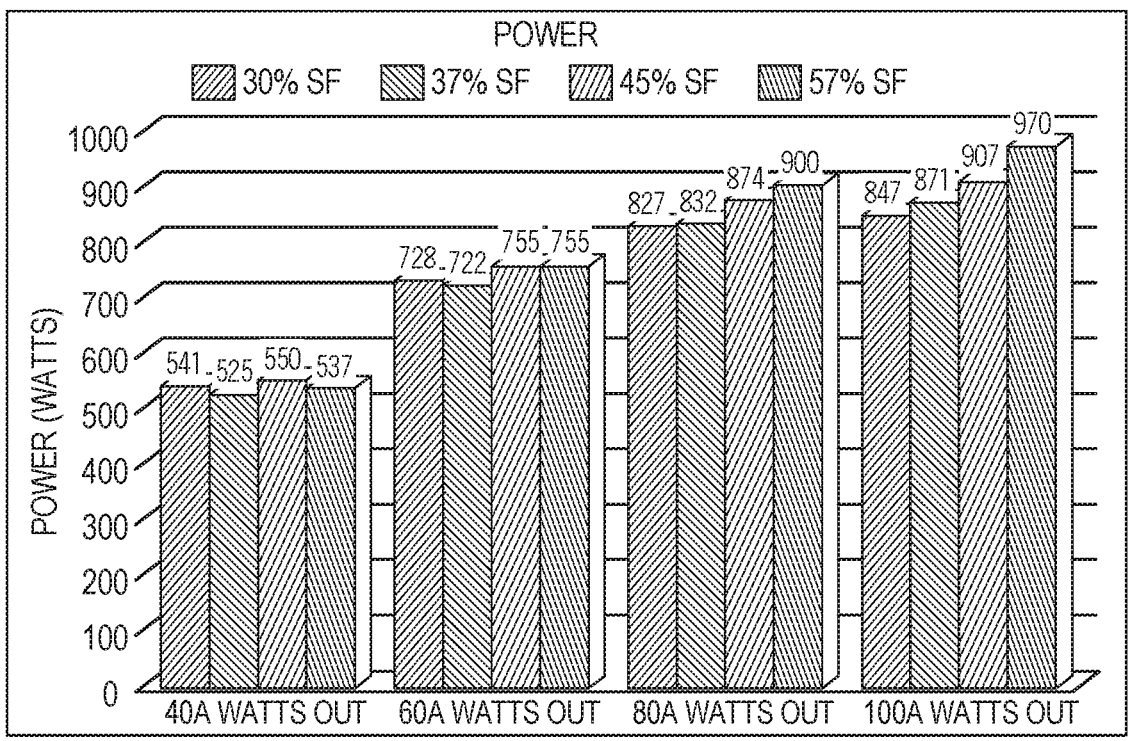
FIG. 43 is a bar graph showing a relationship between amperage used by the motor of FIG. 33, slot-fill ratio of the motor, and power output of the power tool of FIG. 27.

FIG. 43 provides a bar graph representation of power generated by the power tool 500, with the variations of the stator 1100 using a 0.30, 0.37, 0.45, and 0.57 slot-fill ratio respectively at 40 A, 60 A, 80 A and 100 A. In each of the tests, the power out was measured using a dynamometer that could measure the energy output of, e.g. the output driver 507. As shown in FIG. 43, in the higher load 80 A and 100 A tests, there was a positive relationship between the slot-fill ratio and power. In these tests, the increased copper at the higher slot-fill ratios reduced the impedance of the stator coils of stator 1100, resulting in a smaller amount of energy being lost, such that the motor 1000 became more efficient at communicating the power from the battery pack 501 to the output driver 507. Though there is not a straight positive relationship between the slot-fill ratio and power for the 40 A and 60 A tests, it is likely that this was due to variance.

Figure 44:
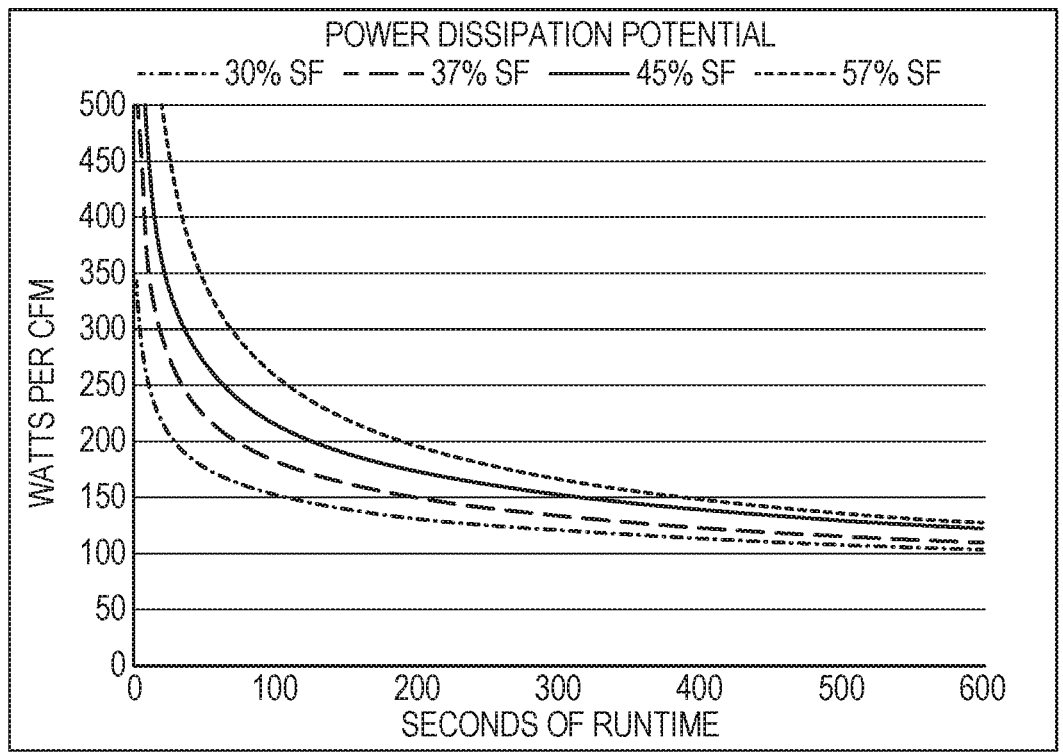
FIG. 44 is a bar graph showing a relationship between amperage used by the motor of FIG. 33, slot-fill ratio of the motor, and power output of the power tool of FIG. 27 to airflow through the power tool.

FIG. 44 illustrates the power out in Watts per CFM, which measures the rate at which the power tool 500 can perform work per rate of airflow to keep the power tool 500 cool, with the variations of the power tool 500 using a 0.30, 0.37, 0.45, and 0.57 slot-fill ratio respectively at 40 A, 60 A, 80 A and 100 A. In the above-described tests, utilizing a higher slot-fill ratio both increases power generated by the motor 1000 and results in a lower CFM because of the additional volume occupied by the copper. However, because the higher slot-fill ratio results in increased heatsinking for the motor drive circuit 524, less air is required to keep the motor drive circuit 524 cool, such that the lower CFM does not negatively affect performance of the motor 1000. Thus, as the slot-fill ratio increases, the capability of the power tool 500 to produce more power for longer periods of time without reaching the critical temperature is increased.

Various features of the invention are set forth in the following claims.

What is claimed is:

1. A power tool comprising:
   an output member,
   a brushless, direct current electric motor having a rotor configured to provide torque to the output member, the brushless, direct current electric motor including a stator, the stator including
      a first stator segment including
         a first annular back portion,
         a first tooth extending radially inward from the first annular back portion,
         a first flange extending away from the first tooth,
         a first insulation portion including
            a first back insulation portion covering the first annular back portion,
            a first tooth portion covering the first tooth, and
            a first flange portion covering the first flange, the first flange portion having a first face that is in facing relationship with the first back insulation portion, and
         a first coil wound around the first tooth,
      a second stator segment separate from the first stator segment and axially coupled to the first stator segment, the second stator segment including
         a second annular back portion,
         a second tooth extending radially inward from the second annular back portion,
         a second flange extending away from the second tooth and toward the first flange,
         a second insulation portion including
            a second back insulation portion covering the second annular back portion,
            a second tooth portion covering the second tooth, and
            a second flange portion covering the second flange, the second flange portion having a second face that is in facing relationship with the second back insulation portion, and
         a second coil wound around the second tooth;
   a battery configured to provide power to the brushless, direct current electric motor; and
   a motor drive circuit configured to control operation of the brushless, direct current electric motor;
   wherein the first face and the second face together substantially define a boundary plane, such that a cross-sectional slot area is defined between the first back insulation portion, the second back insulation portion, the first tooth portion, the second tooth portion, and the boundary plane;
   wherein the first coil and the second coil comprise a plurality of conductive wires arranged between the first and second teeth, the plurality of conductive wires defining a cross-sectional winding area within the cross-sectional slot area;
   wherein a ratio of the cross-sectional winding area to the cross-sectional slot area is greater than or equal to 0.45; and
   wherein when the brushless, direct current electric motor continuously draws 40 Amps of current from the battery, a time to one of the brushless, direct current electric motor and the motor drive circuit reaching a critical temperature is greater than or equal to 511 seconds.

2. The power tool of claim 1, wherein when the brushless, direct current electric motor continuously draws 40 Amps of current from the battery for at least 511 seconds, an airflow through the power tool is less than or equal to 3.8 cubic feet per minute.

3. The power tool of claim 2, wherein when the brushless, direct current electric motor continuously draws 40 Amps of current from the battery for at least 511 seconds, the power tool outputs 537 W of power.

4. The power tool of claim 3, wherein when the brushless, direct current electric motor continuously draws 40 Amps of current from the battery for at least 511 seconds, a ratio of power output of the power tool to the airflow through the power tool is greater than or equal to 141 Watts per cubic feet per minute.

5. A power tool comprising:
an output member,
a brushless, direct current electric motor having a rotor configured to provide torque to the output member, the brushless, direct current electric motor including a stator, the stator including
    a first stator segment including
        a first annular back portion,
        a first tooth extending radially inward from the first annular back portion,
        a first flange extending away from the first tooth,
        a first insulation portion including
            a first back insulation portion covering the first annular back portion,
            a first tooth portion covering the first tooth, and
            a first flange portion covering the first flange, the first flange portion having a first face that is in facing relationship with the first back insulation portion, and
        a first coil wound around the first tooth,
    a second stator segment separate from the first stator segment and axially coupled to the first stator segment, the second stator segment including
        a second annular back portion,
        a second tooth extending radially inward from the second annular back portion,
        a second flange extending away from the second tooth and toward the first flange,
        a second insulation portion including
            a second back insulation portion covering the second annular back portion,
            a second tooth portion covering the second tooth, and
            a second flange portion covering the second flange, the second flange portion having a second face that is in facing relationship with the second back insulation portion, and
        a second coil wound around the second tooth;
a battery configured to provide power to the brushless, direct current electric motor; and
a motor drive circuit configured to control operation of the brushless, direct current electric motor;
wherein the first face and the second face together substantially define a boundary plane, such that a cross-sectional slot area is defined between the first back insulation portion, the second back insulation portion, the first tooth portion, the second tooth portion, and the boundary plane;
wherein the first coil and the second coil comprise a plurality of conductive wires arranged between the first and second teeth, the plurality of conductive wires defining a cross-sectional winding area within the cross-sectional slot area;
wherein a ratio of the cross-sectional winding area to the cross-sectional slot area is greater than or equal to 0.45; and
wherein when the brushless, direct current electric motor continuously draws 60 Amps of current from the battery, a time to one of the brushless, direct current electric motor or the motor drive circuit reaching a critical temperature is greater than or equal to 91 seconds.

6. The power tool of claim 5, wherein when the brushless, direct current electric motor continuously draws 60 Amps of current from the battery for at least 91 seconds, an airflow through the power tool is less than or equal to 3.1 cubic feet per minute.

7. The power tool of claim 6, wherein when the brushless, direct current electric motor continuously draws 60 Amps of current from the battery for at least 91 seconds, the power tool outputs 755 W of power.

8. The power tool of claim 7, wherein when the brushless, direct current electric motor continuously draws 60 Amps of current from the battery for at least 91 seconds, a ratio of power output of the power tool to the airflow through the power tool is greater than or equal to 243 Watts per cubic feet per minute.

9. A power tool comprising:
an output member,
a brushless, direct current electric motor having a rotor configured to provide torque to the output member, the brushless, direct current electric motor including a stator, the stator including
    a first stator segment including
        a first annular back portion,
        a first tooth extending radially inward from the first annular back portion,
        a first flange extending away from the first tooth,
        a first insulation portion including
            a first back insulation portion covering the first annular back portion,
            a first tooth portion covering the first tooth, and
            a first flange portion covering the first flange, the first flange portion having a first face that is in facing relationship with the first back insulation portion, and
        a first coil wound around the first tooth,
    a second stator segment separate from the first stator segment and axially coupled to the first stator segment, the second stator segment including
        a second annular back portion,
        a second tooth extending radially inward from the second annular back portion,
        a second flange extending away from the second tooth and toward the first flange,
        a second insulation portion including
            a second back insulation portion covering the second annular back portion,
            a second tooth portion covering the second tooth, and
            a second flange portion covering the second flange, the second flange portion having a second face that is in facing relationship with the second back insulation portion, and
        a second coil wound around the second tooth;
a battery configured to provide power to the brushless, direct current electric motor; and
a motor drive circuit configured to control operation of the brushless, direct current electric motor;
wherein the first face and the second face together substantially define a boundary plane, such that a cross-sectional slot area is defined between the first back insulation portion, the second back insulation portion, the first tooth portion, the second tooth portion, and the boundary plane;
wherein the first coil and the second coil comprise a plurality of conductive wires arranged between the first and second teeth, the plurality of conductive wires defining a cross-sectional winding area within the cross-sectional slot area;
wherein a ratio of the cross-sectional winding area to the cross-sectional slot area is greater than or equal to 0.45; and wherein when the brushless, direct current electric motor continuously draws 80 Amps of current, a time to one of the brushless, direct current electric motor or the motor drive circuit reaching a critical temperature is greater than or equal to 43 seconds.

10. The power tool of claim 9, wherein when the brushless, direct current electric motor continuously draws 80 Amps of current from the battery for at least 43 seconds, an airflow through the power tool is less than or equal to 2.6 cubic feet per minute.

11. The power tool of claim 10, wherein when the brushless, direct current electric motor continuously draws 80 Amps of current from the battery for at least 43 seconds, the power tool outputs 900 W of power.

12. The power tool of claim 11, wherein when the brushless, direct current electric motor continuously draws 80 Amps of current from the battery for at least 43 seconds, a ratio of power output of the power tool to the airflow through the power tool is greater than or equal to 346 Watts per cubic feet per minute.

13. A power tool comprising:
an output member,
a brushless, direct current electric motor having a rotor configured to provide torque to the output member, the brushless, direct current electric motor including a stator, the stator including
  a first stator segment including
    a first annular back portion,
    a first tooth extending radially inward from the first annular back portion,
    a first flange extending away from the first tooth,
    a first insulation portion including
      a first back insulation portion covering the first annular back portion,
      a first tooth portion covering the first tooth, and
      a first flange portion covering the first flange, the first flange portion having a first face that is in facing relationship with the first back insulation portion, and
    a first coil wound around the first tooth,
  a second stator segment separate from the first stator segment and axially coupled to the first stator segment, the second stator segment including
    a second annular back portion,
    a second tooth extending radially inward from the second annular back portion,
    a second flange extending away from the second tooth and toward the first flange,
    a second insulation portion including
      a second back insulation portion covering the second annular back portion,
      a second tooth portion covering the second tooth, and
      a second flange portion covering the second flange, the second flange portion having a second face that is in facing relationship with the second back insulation portion, and
    a second coil wound around the second tooth;
a battery configured to provide power to the brushless, direct current electric motor; and
a motor drive circuit configured to control operation of the brushless, direct current electric motor;
wherein the first face and the second face together substantially define a boundary plane, such that a cross-sectional slot area is defined between the first back insulation portion, the second back insulation portion, the first tooth portion, the second tooth portion, and the boundary plane;
wherein the first coil and the second coil comprise a plurality of conductive wires arranged between the first and second teeth, the plurality of conductive wires defining a cross-sectional winding area within the cross-sectional slot area;
wherein a ratio of the cross-sectional winding area to the cross-sectional slot area is greater than or equal to 0.45; and
wherein when the brushless, direct current electric motor continuously draws 100 Amps of current, a time to one of the brushless, direct current electric motor or the motor drive circuit reaching a critical temperature is greater than or equal to 26 seconds.

14. The power tool of claim 13, wherein when the brushless, direct current electric motor continuously draws 100 Amps of current from the battery for at least 43 seconds, an airflow through the power tool is less than or equal to 2.0 cubic feet per minute.

15. The power tool of claim 14, wherein when the brushless, direct current electric motor continuously draws 100 Amps of current from the battery for at least 43 seconds, the power tool outputs 970 W of power.

16. The power tool of claim 15, wherein when the brushless, direct current electric motor continuously draws 100 Amps of current from the battery for at least 26 seconds, a ratio of power output of the power tool to the airflow through the power tool is greater than or equal to 485 Watts per cubic feet per minute.

* * * * *